US012718348B2

(12) United States Patent
Tatemizo et al.

(10) Patent No.: US 12,718,348 B2
(45) Date of Patent: Aug. 25, 2026

(54) MONITORING SYSTEM, MONITORING METHOD, PROGRAM, AND COMPUTER-READABLE RECORDING MEDIUM IN WHICH COMPUTER PROGRAM IS STORED

(71) Applicant: NIPPON STEEL CORPORATION, Tokyo (JP)

(72) Inventors: Nobuyuki Tatemizo, Tokyo (JP); Koji Hirano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 264 days.

(21) Appl. No.: 18/283,323

(22) PCT Filed: Jun. 9, 2022

(86) PCT No.: PCT/JP2022/023309
§ 371 (c)(1),
(2) Date: Sep. 21, 2023

(87) PCT Pub. No.: WO2022/260133
PCT Pub. Date: Dec. 15, 2022

(65) Prior Publication Data

US 2024/0177293 A1 May 30, 2024

(30) Foreign Application Priority Data

Jun. 9, 2021 (JP) ................................ 2021-096468

(51) Int. Cl.
*G01N 21/85* (2006.01)
*G01N 21/88* (2006.01)
*G06T 7/00* (2017.01)
*G06T 7/70* (2017.01)
*G06V 10/25* (2022.01)

(52) U.S. Cl.
CPC ....... *G06T 7/0008* (2013.01); *G01N 21/8851* (2013.01); *G06T 7/70* (2017.01);
(Continued)

(58) Field of Classification Search
CPC ......... G01N 21/8851; G01N 2021/888; G01N 21/85; G01N 2021/8854;
(Continued)

(56) References Cited

U.S. PATENT DOCUMENTS

2020/0012894 A1 1/2020 Lee
2020/0074690 A1 3/2020 Fukagai et al.
2023/0316489 A1* 10/2023 Ogasawara ........... B07C 5/3422 382/159

FOREIGN PATENT DOCUMENTS

CN 113810605 A * 12/2021 ........... H04N 23/951
JP H07-253400 A 10/1995
(Continued)

OTHER PUBLICATIONS

Redmon et al., "You Only Look Once: Unified, Real Time Object Detection", University of Washington, Allen Institute for AI, May 9, 2016, internet <https://arxiv.org/abs/1506.02640>, [retrieved on May 18, 2021].

(Continued)

*Primary Examiner* — Bobbak Safaipour
*Assistant Examiner* — Dylan J Sherrillo
(74) *Attorney, Agent, or Firm* — Myers Wolin, LLC

(57) ABSTRACT

A monitoring system that is a system for monitoring an iron scrap, includes a photographing unit that photographs the iron scrap a plurality of times at different viewpoints or at different timings, an incompatible object identifying unit that inputs a plurality of images obtained by photographing with the photographing unit into a learning model to identify each of a type and a position of an incompatible object that is a target to be removed from the iron scrap and a probability of being an incompatible object, and an output unit that outputs each of the type and position of the incompatible object when the probability identified with the incompatible
(Continued)

object identifying unit has exceeded a predetermined threshold value.

20 Claims, 11 Drawing Sheets

(52) U.S. Cl.
CPC ....... *G06V 10/25* (2022.01); *G01N 2021/888* (2013.01); *G06T 2207/30136* (2013.01)

(58) Field of Classification Search
CPC ... G01N 2021/8883; G01N 2021/8887; G01N 2201/1042; G06T 7/70; G06T 2207/30136; G06T 7/0004; G06T 7/00; G06V 10/25; G06V 20/52; B09B 5/00; G05B 19/418; G06N 3/08
See application file for complete search history.

(56) References Cited

FOREIGN PATENT DOCUMENTS

| | | | | |
|---|---|---|---|---|
| JP | 2020-35195 | A | | 3/2020 |
| JP | 2020095709 | A | * | 6/2020 |
| JP | 2020-176909 | A | | 10/2020 |
| JP | 2021-86285 | A | | 6/2021 |
| JP | 2021086285 | A | * | 6/2021 |
| WO | 2019/208729 | A1 | | 10/2019 |

OTHER PUBLICATIONS

Ronneberger et al., "U-Net: Convolutional Networks for Biomedical Image Segmentation", University of Freiburg, Germany, May 18, 2015, internet <URL: https://arxiv.org/abs/1505.04597>, [retrieved on May 18, 2021].

Akcay et al., "GANomaly: Semi-Supervised Anomaly Detection via Adversarial Training", Durham University, UK, Nov. 13, 2018, internet <URL: https://arxiv.org/abs/1805.06725>, [retrieved on May 18, 2021].

Bergmann et al., "Improving Unsupervised Defect Segmentation by Applying Structural Similarity to Autoencoders", MVTec Software GmbH, University of Amsterdam, Feb. 1, 2019, internet <https://arxiv.org/abs/1807.02011>, [retrieved on May 18, 2021].

Napoletano et al., "Anomaly Detection in Nanofibrous Materials by CNN-Based Self-Similarity", University of Milano-Bicocca, Italy, Jan. 12, 2018, internet <https://www.ncbi.nlm.nih.gov/pmc/articles/PMC5795842/>, [retrieved on May 18, 2021].

* cited by examiner

IRON SCRAP PRESENCE REGION (RECTANGULAR FRAME)

ORIGINAL IMAGE

MARKED IMAGE

RECTANGULAR FRAME-GENERATED IMAGE

MONITORING SYSTEM, MONITORING METHOD, PROGRAM, AND COMPUTER-READABLE RECORDING MEDIUM IN WHICH COMPUTER PROGRAM IS STORED

CROSS-REFERENCE TO RELATED APPLICATION

This application is a National Phase under 35 U.S.C. 371 of PCT/JP2022/023309 filed on Jun. 9, 2022, and designated the U.S., which claims priority to Japanese Patent Application No. 2021-096468, filed on Jun. 9, 2021. The contents of each are wholly incorporated herein by reference.

TECHNICAL FIELD

The present disclosure relates to a monitoring system, a monitoring method, a program, and a computer-readable recording medium in which a computer program is stored. Priority is claimed on Japanese Patent Application No. 2021-096468, filed Jun. 9, 2021, the content of which is incorporated herein by reference.

RELATED ART

In recent years, due to the necessity of reducing $CO_2$ emissions against the background of the global warming problem, in the iron and steel industry, an electric furnace method has been attracting attention instead of the blast furnace method, which is a main manufacturing method at present. A main raw material in the electric furnace method is iron scraps. However, when a tramp element such as copper is incorporated thereinto, the tramp element causes defective products such as cracks in the manufacturing of high-grade steel such as steel sheets for vehicles. In addition, when a sealed material such as a gas cylinder is incorporated thereinto, there is a risk of causing explosion in electric furnaces. Therefore, a technique for removing tramp element-containing substances, sealed materials, or the like from iron scraps is important.

Patent Document 1 discloses a technique in which a group of crushed iron scraps is photographed with a color TV camera and copper-containing crushed pieces are automatically identified based on the saturation value and the hue angle value. However, in the technique described in Patent Document 1, detectable objects are limited to copper. In addition, objects in which a copper wire is included and is not visible from the outside such as a motor cannot be detected.

Patent Document 2 discloses a method in which a group of scraps loaded on the bed of a truck are photographed with a camera, whether or not an incompatible object (an object to be removed) is shown in the photographed data is determined with artificial intelligence (hereinafter, also referred to as deep learning model), and, if an incompatible object is shown, the result is notified to the operator, and the incompatible object is removed.

RELATED ART DOCUMENT

Patent Document

[Patent Document 1] Japanese Unexamined Patent Application, First Publication No. H7-253400

[Patent Document 2] Japanese Unexamined Patent Application, First Publication No. 2020-176909

Non-Patent Document

[Non-Patent Document 1] Joseph Redmon and three others, "You Only Look Once: Unified, Real-Time Object Detection" [searched on May 18, 2021], Internet <https://arxiv.org/abs/1506.02640>

[Non-Patent Document 2] Olaf Ronneberger and two others, "U-Net: Convolutional Networks for Biomedical Image Segmentation" [searched on May 18, 2021], Internet <URL:https://arxiv.org/abs/1505.04597>

[Non-Patent Document 3] Samet Akcay and two others, "GANomaly: Semi-Supervised Anomaly Detection via Adversarial Training" [searched on May 18, 2021], Internet <https://arxiv.org/abs/1805.06725>

[Non-Patent Document 4] Paul Bergmann and three others, "Improving Unsupervised Defect Segmentation by Applying Structural Similarity to Autoencoders", [searched on May 18, 2021], Internet <https://arxiv.org/abs/1807.02011>

[Non-Patent Document 5] Paola Napoletano and two others, "Anomaly Detection in Nanofibrous Materials by CNN-Based Self-Similarity", [searched on May 18, 2021], Internet <https://www.ncbi.nlm.nih.gov/pmc/articles/PMC5795842/>

SUMMARY

Problems to be Solved

However, in Patent Document 2, photographing of a group of iron scraps loaded on the bed of a truck in a stationary state is premised. Therefore, the group of iron scraps in a stationary state is photographed at a timing where a lift magnet, which interferes with photographing, is not shown within the angle of view of the camera for photographing the group of iron scraps. The fact that the lift magnet is not shown within the angle of view of the camera is confirmed with a position sensor, by the operator, or with a deep learning model. After this confirmation step, a determination process of the presence or absence of an incompatible object by photographing with a camera or a deep learning model and the display of the determination result to the operator are performed.

In such a method of Patent Document 2, an object or the like that is present slightly inside from the surface of the group of scraps on the bed is difficult to find in an image, and thus there are cases where an incompatible object may be undetected.

The present disclosure has been made in view of the above-described circumstances. That is, an object is to provide a monitoring system, a monitoring method, a program, and a computer-readable recording medium in which a computer program is stored that are capable of distinguishing an incompatible object that is contained in iron scraps more accurately than ever without missing even in a case where the presence or absence of the incompatible object is automatically determined using a technique such as image processing.

Means for Solving the Problem

In order to solve the above-described problem, according to a certain viewpoint of the present disclosure, provided is a monitoring system that is a system for monitoring an iron scrap, including a photographing unit that photographs the iron scrap a plurality of times at different viewpoints or at different timings, an incompatible object identifying unit that inputs a plurality of images obtained by photographing with the photographing unit into a learning model to identify each of a type and a position of an incompatible object that is a target to be removed from the iron scrap and a probability of being an incompatible object, and an output unit that outputs each of the type and position of the incompatible object when the probability identified with the incompatible object identifying unit has exceeded a predetermined threshold value.

The photographing unit may be composed of a plurality of cameras, and the incompatible object identifying unit may input an image obtained from each of the cameras into one or a plurality of learning models and identify the type and position of the incompatible object and the probability of being an incompatible object.

The photographing unit may be composed of a single camera, and the incompatible object identifying unit may input a plurality of images obtained from the camera at different timings into one or a plurality of learning models and identify the type and position of the incompatible object and the probability of being an incompatible object.

A transportation unit that transports the iron scrap may be provided, the photographing unit may perform photographing the iron scrap with the iron scrap tracked while being transported, by sequentially adjusting a photographing direction and a photographing magnification based on at least any information regarding a position of the iron scrap while being transported with the transportation unit and an operation of the transportation unit, and the incompatible object identifying unit may input a plurality of images obtained by photographing with the iron scrap tracked into the learning model and identify the type and position of the incompatible object and the probability of being an incompatible object.

A region extraction unit that extracts a region that possibly includes the incompatible object from each of the plurality of images obtained by photographing with the photographing unit may be further provided, and the incompatible object identifying unit may input an image of each region extracted with the region extraction unit into the learning model and identify the type and position of the incompatible object and the probability of being an incompatible object.

The transportation unit may be a lift magnet, and the photographing unit may sequentially adjust the photographing direction and the photographing magnification depending on a magnetic force intensity or a suspended load amount of the lift magnet.

A transportation unit that transports the iron scrap may be provided, the transportation unit may be a lift magnet, and the region extraction unit may change a region size to be extracted depending on a magnetic force intensity or a suspended load amount of the lift magnet.

In addition, in order to solve the above-described problem, according to another viewpoint of the present disclosure, provided is a monitoring method for monitoring an iron scrap, having a photographing step of photographing the iron scrap a plurality of times at different viewpoints or at different timings, an incompatible object identifying step of inputting a plurality of images obtained by photographing in the photographing step into a predetermined learning model to sequentially identify a type and a position of an incompatible object that is a target to be removed from the iron scrap and a probability of being an incompatible object, and an output step of outputting each of the type and position of the incompatible object when the probability identified by the incompatible object identifying step has exceeded a predetermined threshold value.

In addition, in order to solve the above-described problem, according to still another viewpoint of the present disclosure, provided is a program for executing a photographing procedure of photographing an iron scrap that is monitored a plurality of times at different viewpoints or at different timings, an incompatible object identifying procedure of inputting a plurality of images obtained by photographing in the photographing procedure into a predetermined learning model to sequentially identify a type and a position of an incompatible object that is a target to be removed from the iron scrap and a probability of being an incompatible object, and an output procedure of outputting each of the type and position of the incompatible object when the probability identified by the incompatible object identifying procedure has exceeded a predetermined threshold value.

In addition, in order to solve the above-described problem, according to still another viewpoint of the present disclosure, provided is a computer-readable recording medium in which a computer program is stored for executing a photographing procedure of photographing an iron scrap that is monitored a plurality of times at different viewpoints or at different timings, an incompatible object identifying procedure of inputting a plurality of images obtained by photographing in the photographing procedure into a predetermined learning model to sequentially identify a type and a position of an incompatible object that is a target to be removed from the iron scrap and a probability of being an incompatible object, and an output procedure of outputting each of the type and position of the incompatible object when the probability identified by the incompatible object identifying procedure has exceeded a predetermined threshold value.

Effects

According to the present disclosure, since iron scraps are monitored at different viewpoints (including still images or a video photographed at a plurality of cameras) or at different timings (including a video photographed with a single or a plurality of cameras), the presence or absence of an incompatible object can be more accurately determined than ever even in a case where the incompatible object is present slightly inside from the surfaces of the group of iron scraps.

DETAILED DESCRIPTION

Hereinafter, a preferred embodiment of the present disclosure will be described in detail with reference to the accompanying drawings. In the present specification and the drawings, configuration elements having substantially the same function and configuration will be given the same reference symbol and will not be described again.

1. Overview

Figure 1:
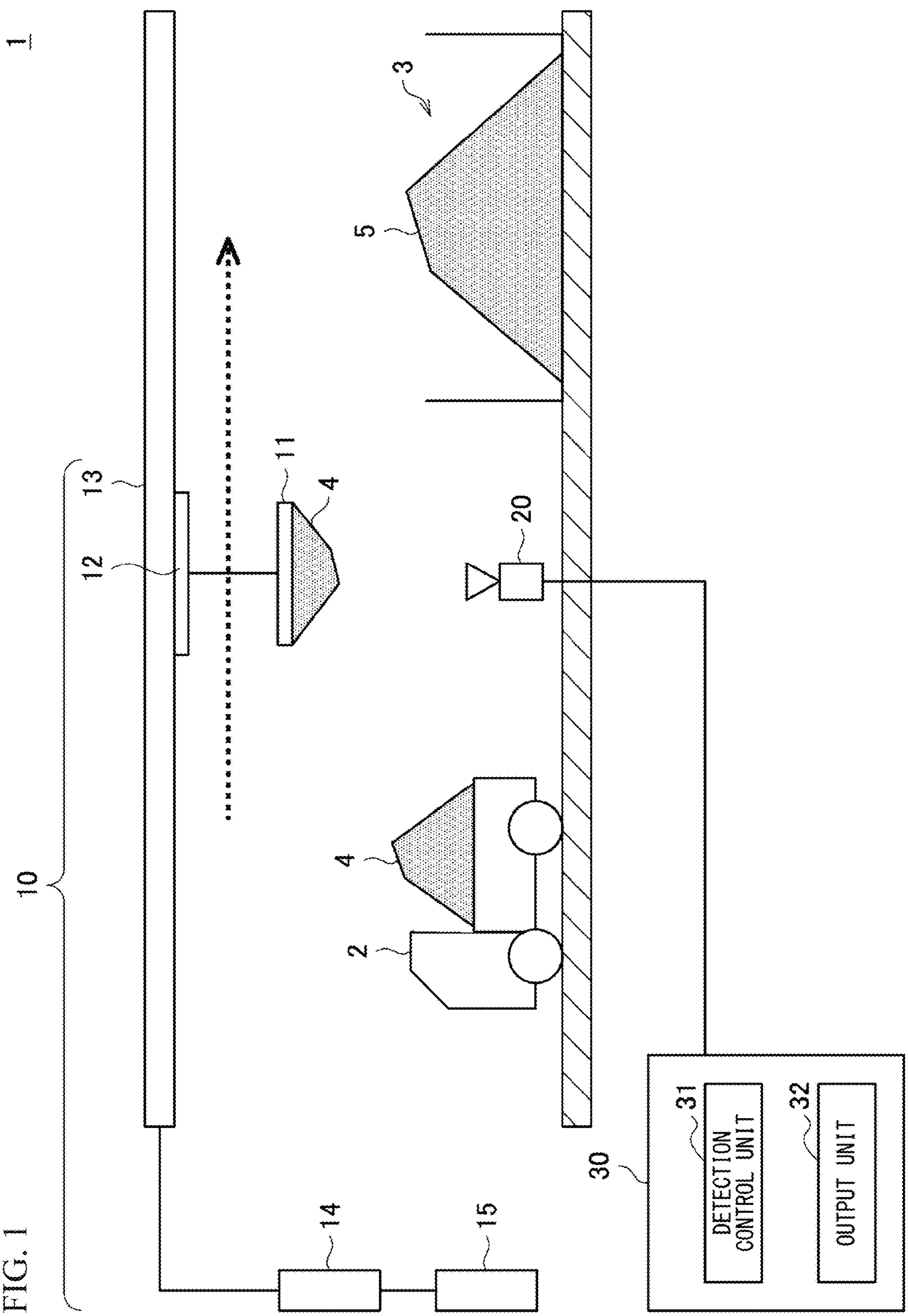
FIG. 1 is a view showing an application example of a monitoring system according to the present embodiment.

First, an overview of an embodiment of the present disclosure will be described with reference to FIG. 1. FIG. 1 is a view showing an application example of a monitoring system 1 according to the present embodiment. As shown in FIG. 1, the monitoring system 1 is a system that monitors iron scraps and is used in, for example, an iron scrap yard. When iron scraps generated in factories, cities, or the like are carried into the iron scrap yard with a truck 2, the iron scraps are transported (unloaded) to an inspected iron scrap piling yard 3 using a transportation device 10 such as a lift magnet.

There is a possibility that an incompatible object acceptance of which is banned by a steel manufacturer may have been incorporated into the iron scraps that have been just carried in by the truck 2. Therefore, it is necessary to inspect the carried-in iron scraps before reuse for the manufacturing of iron or the like and, if the iron scraps contain any incompatible object, to remove the incompatible object from the iron scraps. Here, the incompatible object includes motors containing a non-iron component such as copper, gas cylinders, which may explode when injected into molten steel, and the like. In addition, hereinafter, iron scraps before inspection will be referred to as uninspected iron scraps 4, and iron scraps after inspection will be referred to as inspected iron scraps 5.

Therefore, the monitoring system 1 according to the present embodiment photographs the uninspected iron scraps 4 in a state of being placed on the bed of the truck 2 or the uninspected iron scraps 4 while being transported with the transportation device 10 and performs inspection by image processing. Specifically, in the monitoring system 1 according to the present embodiment, a learning model capable of detecting incompatible objects that are contained in iron scraps has been generated in advance using a technique such as deep learning. From the learning model, not only the types and positions of incompatible objects but also the probabilities of being an incompatible object are output. When an image newly acquired by photographing the uninspected iron scraps 4 has been input into this learning model, in a case where an incompatible object is detected from the image and the probability of being the above-described incompatible object exceeds a predetermined threshold value, such a fact is notified to an operator, and removal of the incompatible object is urged. Hereinafter, the learning model will be described as a deep learning model generated by the deep learning technique in many cases, but the type of the learning model is not limited thereto, and the learning model may be, for example, a model generated not by deep learning but by an ordinary machine learning technique.

In the monitoring system 1 according to the present embodiment, images obtained by a plurality of photographing at different viewpoints or at different timings (for example, in a case where photographing is continuously performed at different timings, about 30 images per second) are sequentially input into the learning model, and incompatible objects are detected each time. Therefore, in the monitoring system 1 according to the present embodiment, the probability of discovering an incompatible object increases compared with Patent Document 2 in which incompatible objects are inspected only once on the bed of the truck 2.

Hereinafter, the monitoring system 1 according to the embodiment will be described in detail.

2. Configuration of Entire Monitoring System 1

As shown in FIG. 1, the monitoring system 1 according to the present embodiment includes the transportation device 10, a photographing device 20, and an incompatible object detection device 30.

(Transportation Device 10)

The transportation device 10 transports the uninspected iron scraps 4 from the bed of the truck 2 stopped at a predetermined position in the iron scrap yard to the inspected iron scrap piling yard 3. In the example shown in FIG. 1, the transportation device 10 includes a lift magnet 11, a crane 12, a crane rail 13, a transportation control unit 14, and an operation unit 15 and is capable of lifting and transporting the uninspected iron scraps 4 with a magnetic force. However, the present disclosure is not limited to such an example, and the transportation device 10 may be a mechanical device such as a belt conveyor, an arm, or heavy machinery and may have any form as long as the transportation device is capable of transporting the uninspected iron scraps 4 from the bed of the truck 2 to the inspected iron scrap piling yard 3.

The lift magnet 11 includes a device that generates a magnetic force in a housing and adsorbs and desorbs the uninspected iron scraps 4 having magnetism by controlling the intensity of the magnetic force. The crane 12 has a structure by which the lift magnet 11 can be suspended with a wire or the like and moves up and down the lift magnet 11. The crane rail 13 has a rail enabling the crane 12 to be moved in the depth direction and the lateral direction in FIG. 1. Therefore, the crane 12 can move along the crane rail 13 and can freely change the position within a specific range of the iron scrap yard. The transportation control unit 14 controls the intensity of the magnetic force of the lift magnet 11 and the moving up and down and position of the crane 12 based on an instruction from the operation unit 15. The operation unit 15 has an operation mechanism that receives an operation by the operator (for example, an operation panel) and transmits an instruction (signal) for controlling the lift magnet 11 and the crane 12 to the transportation control unit 14 based on the operator's operation.

(Photographing Device 20)

The photographing device 20 photographs the uninspected iron scraps 4 in a state of being placed on the bed of the truck 2 or the uninspected iron scraps 4 while being transported with the transportation device 10 with a photographing unit. This is defined as a photographing step. In the example shown in FIG. 1, the photographing device 20 is composed of a single camera and continuously performs photographing a plurality of times at different timings to create a video. However, the photographing device 20 may be composed of a plurality of cameras, and each camera may perform photographing a plurality of times at different viewpoints to create a plurality of still images. In addition, basically, the iron scraps 4 continuously move with the help of the transportation device 10, and the iron scraps 4 while being transported becomes photographing targets of the plurality of cameras.

The fact that each camera performs photographing a plurality of times at different viewpoints means that the plurality of cameras are installed at different places and each camera photographs the iron scraps in chronological order at a plurality of timings. Alternatively, in a case where there is one camera, the camera may perform photographing while changing the position of a photographing device with respect to the iron scraps or may perform photographing while changing the photographing magnification.

In addition, the fact that photographing is performed a plurality of times at different timings means that the iron scraps are photographed in chronological order at a plurality of timings. In a case where there are a plurality of cameras, the photographing timing of each camera may or may not coincide with others.

Figure 2:
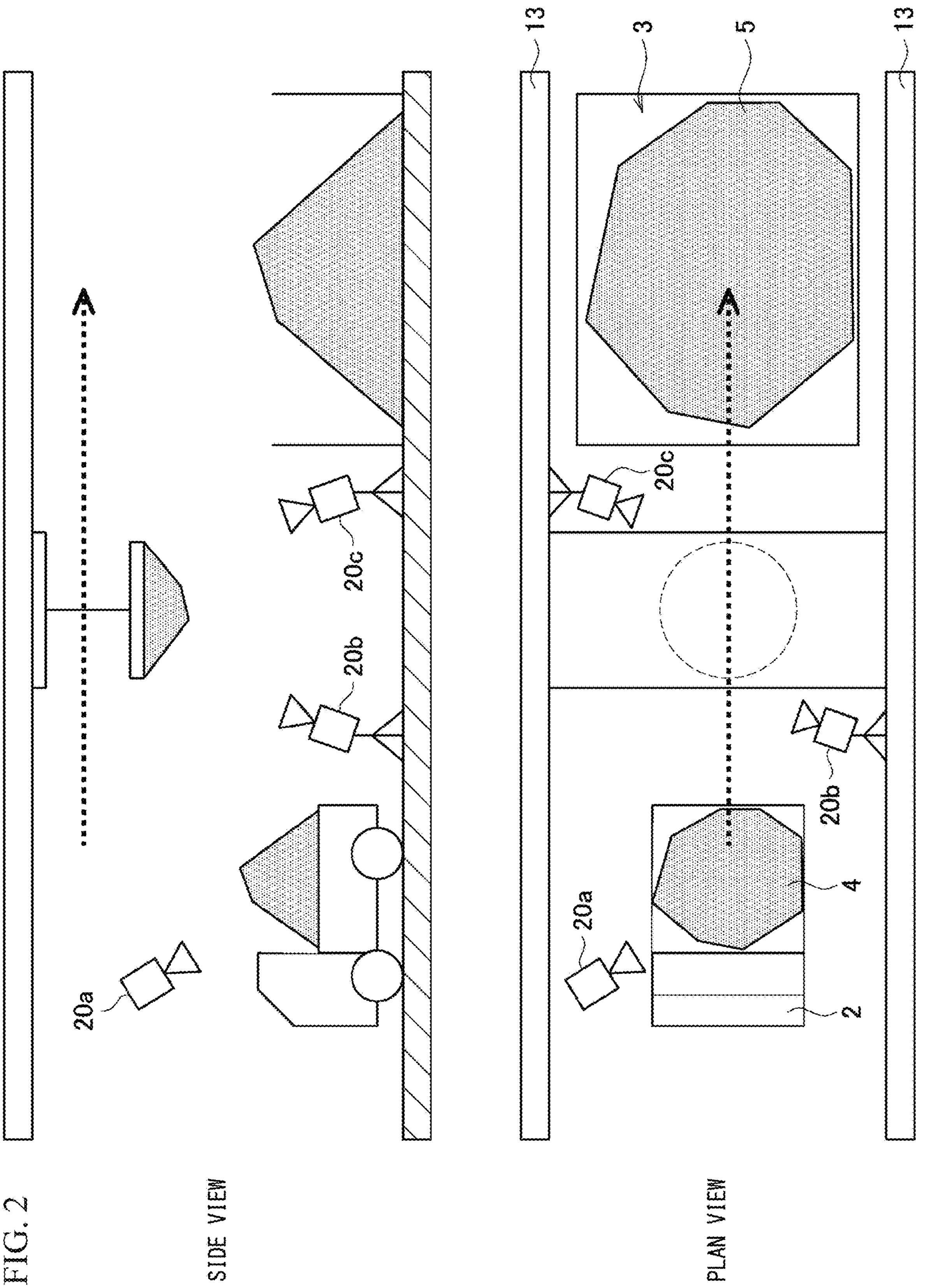
FIG. 2 shows views showing an example in which a photographing device is composed of three cameras.

FIG. 2 is a view showing an example in which the photographing device 20 is composed of three cameras. The upper picture of FIG. 2 is a view of the iron scrap yard seen from a side, and the lower picture of FIG. 2 is a view of the iron scrap yard seen from the top. As shown in FIG. 2, the photographing device 20 may be composed of a first camera 20*a* provided above the bed of the truck 2, a second camera 20*b* provided at a position where the uninspected iron scraps 4 can be photographed from below the lift magnet 11 at different viewpoints, and a third camera 20*c*. It is needless to say that, even in a case where the photographing device 20 is composed of a plurality of cameras, each camera may create a video. The video or a plurality of still images created by the photographing device 20 is output to the incompatible object detection device 30.

(Incompatible Object Detection Device 30)

Returning to FIG. 1, the incompatible object detection device 30 detects incompatible objects in the images (including still images and a video) obtained from the photographing device 20 and notifies the operator the detection results. In order to realize this, in the example shown in FIG. 1, the incompatible object detection device 30 includes a detection control unit 31 and an output unit 32.

(Detection Control Unit 31)

The detection control unit 31 controls the photographing device 20 to photograph the uninspected iron scraps 4 a plurality of times at different viewpoints or at different timings and acquire a video or a plurality of still images. The detection control unit 31 inputs the plurality of acquired images (that is, a video or a plurality of still images) to a deep learning model (a learning model that has been trained by machine learning) to sequentially identify the types and positions of the incompatible objects and the probabilities of being an incompatible object. In addition, when the identified probability of being an incompatible object exceeds a predetermined threshold value, the detection control unit 31 transmits each of the type and position of the incompatible object and the probability of being an incompatible object to the output unit 32.

The learning model may not be common (single) with respect to the plurality of images, and a plurality of learning models may be provided. For example, in a case where the photographing device 20 is composed of a plurality of cameras, a different learning model may be provided for each camera. Even in a case where the photographing device 20 is composed of a single camera, for example, a different learning model specialized in detecting each incompatible object may be provided for each type of incompatible object such as a motor or a gas cylinder.

Hereinafter, a modification example of the detection control unit 31 will be described. In the modification example, a case where the photographing device 20 is composed of a single camera will be dealt with. As described above, in the present embodiment, a single camera continuously performs photographing a plurality of times at different timings, and the process of the deep learning model is performed, whereby the types and positions of the incompatible objects and the probabilities of being an incompatible object are output for each of the camera and the timings. Here, the probability of being an incompatible object at the current time may be calculated as a function of the probability of being an incompatible object at the current time and the probabilities of being an incompatible object at a plurality of timings earlier than the current time and then compared with a predetermined threshold value for determining whether or not the inspected object is an incompatible object. For example, the probability may be calculated as the average (backward moving average), maximum value, minimum value or the like of a plurality of probabilities of being an incompatible object at a plurality of timings for which a difference from the current time is within a predetermined time range. When the backward moving average is adopted, overdetection can be suppressed. That is, even in a case where the deep learning model has made a wrong determination for an object other than the incompatible objects to have high probability of being an incompatible object by accident at a certain timing, if the probabilities of being an incompatible object were output right to be low at a plurality of timings in the past, the backward moving average can be kept low. This makes it possible to more accurately identify incompatible objects.

In addition, in the case of using a configuration of a plurality of cameras as shown in FIG. 2, the probability of being a certain incompatible object at a certain time may be calculated as a function of a plurality of probabilities of being the incompatible object, which are obtained as the results of the deep learning model processes on a plurality of camera images at that time, and then compared with a predetermined threshold value for determining whether or not the incompatible object is an incompatible object. Specifically, for example, the probability may be calculated as the sum of the probabilities of being the incompatible object with respect to the plurality of cameras at that time. This accumulated process is effective for suppressing undetection. That is, in a conveyance process of the uninspected iron scraps, a situation in which only a part of an incompatible object is shown in the image of a certain camera and, similarly, only a part of the incompatible object is shown in the image of another camera may occur. In such a case, when the probability of being an incompatible object is calculated for each camera, only a part of the incompatible object is shown, and the probability of being an incompatible object becomes low and does not exceed the predetermined threshold value for determining whether or not the inspected object is an incompatible object, which leads to undetection. On the other hand, when the probability of being an incompatible object with respect to each camera is accumulated as described above, the accumulated value exceeds the predetermined threshold value, which makes it possible to detect the incompatible object. In the accumulation, a weighted sum may be adopted by giving a weighting factor to each camera instead of adopting the simple sum. The probability of being an incompatible object obtained from each camera image is affected by the distance between the camera and the uninspected iron scraps, and a difference in reliability is caused among the cameras, but the weighted sum corrects the difference. As an example, the difference in reliability may be indexed by the distance between the camera and the uninspected iron scraps or the like, and the weighted sum for which the distance or the like is used as a coefficient may be adopted.

In addition, in the calculation of the probability of being an incompatible object, the processing of the probabilities at a plurality of timings in the time direction and the processing of the probabilities with respect to the plurality of cameras, each of which has been described above, may be combined. For example, in the above-described phenomenon in which a part of an incompatible object is shown in each of two or more cameras, there are cases where a part of the incompatible object is shown in one camera and then a part of the incompatible object is shown in another camera, thereby causing a time lag. In this case, even when the probabilities of being an incompatible object with respect to the plurality of cameras at one timing are accumulated together, the probability with respect to all timings does not exceed the predetermined threshold value for determining whether or not the inspected object is an incompatible object, which leads to undetection. On the other hand, when the processing of the probabilities at a plurality of timings in the time direction are combined, even in a case where there is the above-described time lag, it is possible to decrease the influence and to detect incompatible objects.

(Output Unit 32)

The output unit 32 outputs the information transmitted from the detection control unit 31. That is, when the probability of being an incompatible object has exceeded the predetermined threshold value in the incompatible object identifying procedure, the output unit 32 outputs each of the type and position of the incompatible object. In addition, the output unit 32 may also output an image used for the detection of the incompatible object (an original image shown in FIG. 6 to be described below) and an image of the detection result (a marked image shown in FIG. 6, and a rectangular frame-generated image) together. In addition, the output unit 32 may also output the probability of being an incompatible object identified by the deep learning model together.

Such an output unit 32 may be a display that displays a character string, an image, or the like or may be a speaker that outputs sound. The output unit 32 may be integrally provided with the incompatible object detection device 30 or may be independently provided at a position away from the incompatible object detection device 30. This makes it possible for the operator who has received the output of the output unit 32 to easily and accurately recognize the fact that there is a concern that the incompatible objects may be in the uninspected iron scraps 4 and to appropriately remove the incompatible objects from the uninspected iron scraps 4.

With the above-described configuration, the monitoring system 1 according to the first embodiment photographs the uninspected iron scraps 4 in a state of being placed on the bed of the truck 2 or the uninspected iron scraps 4 while being transported with the transportation device 10 and inspects the uninspected iron scraps 4 using a plurality of images (a video or a plurality of still images) obtained by the photographing.

3. Function and Configuration of Incompatible Object Detection Device 30

Figure 3:
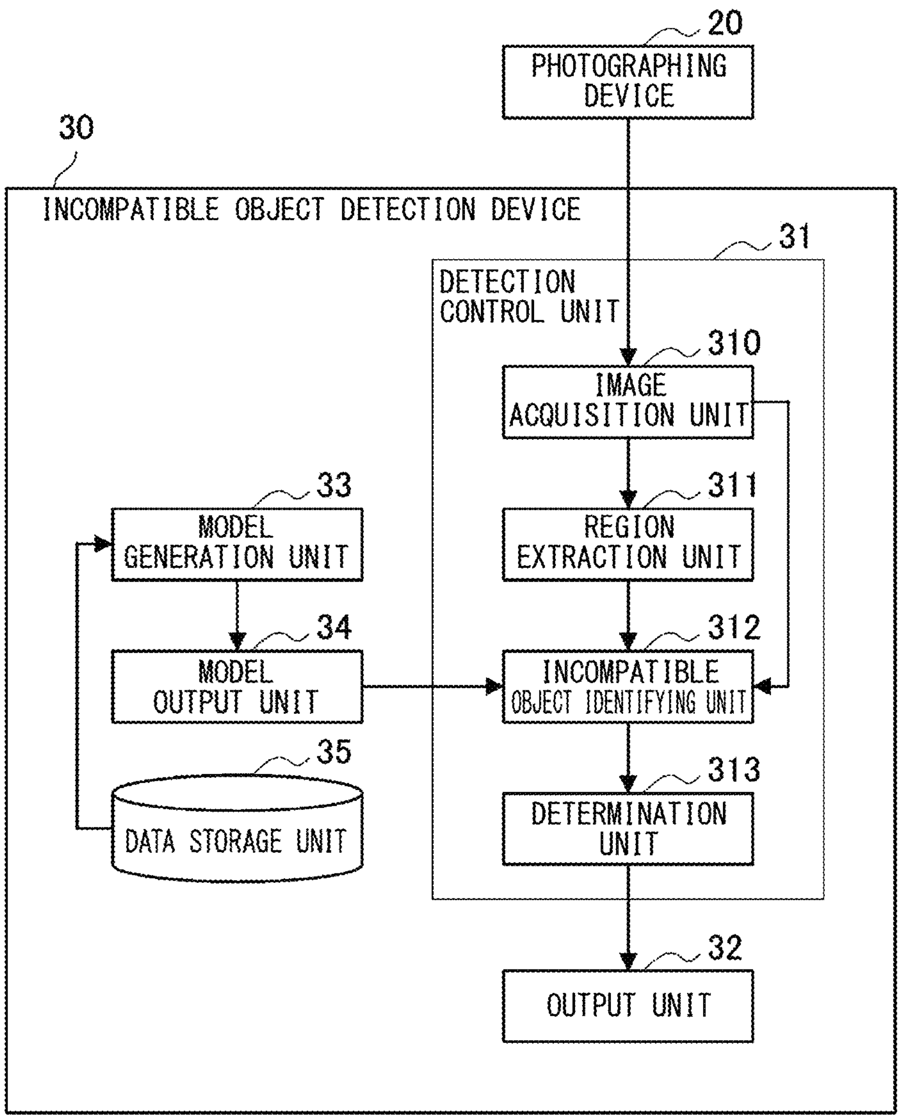
FIG. 3 is a block diagram showing an example of the function and configuration of an incompatible object detection device.

Next, the function and configuration of the incompatible object detection device 30 will be described. FIG. 3 is a block diagram showing an example of the function and configuration of the incompatible object detection device 30.

As shown in FIG. 3, the above-described detection control unit 31 of the incompatible object detection device 30 has an image acquisition unit 310, a region extraction unit 311, an incompatible object identifying unit 312, and a determination unit 313.

(Image Acquisition Unit 310)

The image acquisition unit 310 controls the photographing device 20 to repeat the photographing procedure on the uninspected iron scraps 4 a plurality of times at different viewpoints or at different timings and acquire a plurality of images (a video or a plurality of still images). The image acquisition unit 310 converts the images acquired from the photographing device 20 into an appropriate predetermined size and outputs the images to the region extraction unit 311 or the incompatible object identifying unit 312.

(Region Extraction Unit 311)

The region extraction unit 311 extracts a region that possibly includes the incompatible object (hereinafter, referred to as "the presence region of an iron scrap") from each of the plurality of images (the images converted into the predetermined size) obtained by photographing with the photographing device 20. The presence region of an iron scrap is a region where an iron scrap while being transported is present and is, for example, the surface of a scrap at the transportation start place (Specifically, the bed of the truck or the like), the surface of a scrap at the transportation end place or an iron scrap while being transported.

For example, the region extraction unit 311 identifies the presence region of an iron scrap using the deep learning model or the like, extracts only the identified presence region of an iron scrap, and outputs the extracted region to the incompatible object identifying unit 312.

When a plurality of images are input as input images into the deep learning model (well-known YOLOv3 (Non-Patent Document 1)), the monitoring system detects objects other than the iron scraps while being transported, to which the operator does not pay attention, as foreign objects or responses to a foreign object in scraps that have been already inspected, which is not practical. Therefore, as the extraction of "the presence region of an iron scrap", regions of the lift magnet and the iron scraps may be identified using an object detection model and the extracted presence region of an iron scrap may be applied to a foreign object detection model. In addition, the coordinate of the transportation unit such as the lift magnet may be acquired from the operation information of the operator, mapping information, which informs what position in the image the transportation unit or an iron scrap is present if the transportation unit is present at a specific coordinate, may be prepared in advance, and the presence region of an iron scrap may be extracted based on the mapping information. In addition, "the presence region of an iron scrap" may be detected from information of a plurality of images which are continuous in chronological order. This makes it possible to prevent erroneous detection in the incompatible object identifying unit 312 and makes the processing time short at the same time. In addition, the deep learning model is, for example, a trained model generated by deep learning (deep learning) such as a neural network or the like. As a method for the deep learning, it is possible to apply a multi-layer neural network such as a convolutional neural network (CNN), but the method is not limited thereto.

Figure 4A:
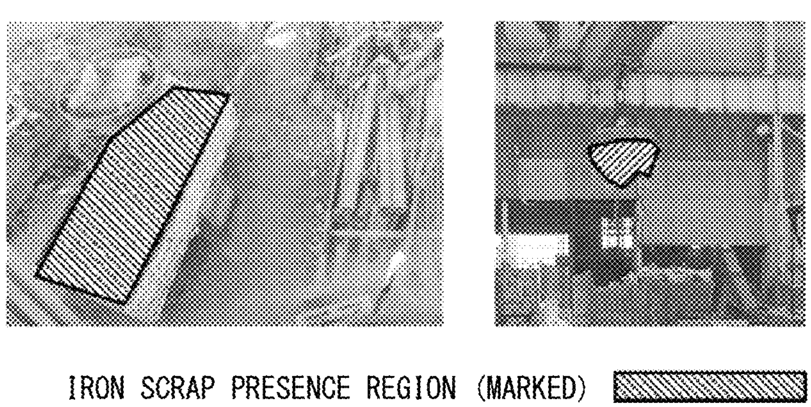
FIG. 4A shows views showing a presence region of an iron scrap.

FIG. 4A is a view showing the presence region of an iron scrap. As shown in FIG. 4A, the presence region of an iron scrap is a region determined for each pixel. When an incompatible object is identified with the incompatible object identifying unit 312 using only the image of the presence region of an iron scrap as described above, an image region where the incompatible object identifying unit 312 searches for incompatible objects is limited, which makes it possible to shorten the processing time.

An image that is input to the deep learning model with which the presence region of an iron scrap is extracted with the region extraction unit 311 may have a lower resolution than an image that is input to the deep learning model used in the incompatible object identifying unit 312, and thus the processing time is also short. Therefore, addition of the region extraction unit 311 does not extend the entire processing time compared with a case where the region extraction unit 311 is not present.

Figure 4B:
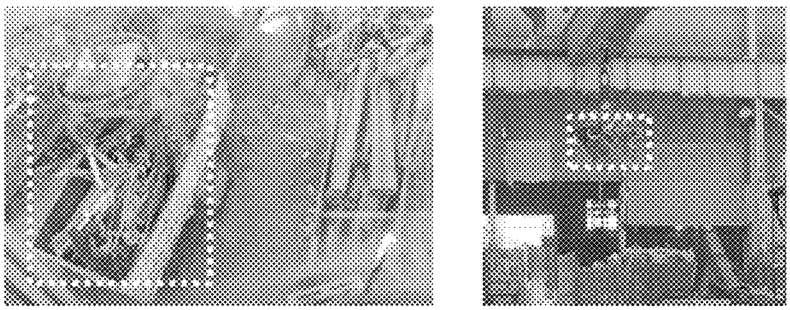
FIG. 4B shows views in which the presence region of an iron scrap is indicated by a rectangular frame.

In addition, FIG. 4B is a view in which the presence region of an iron scrap is indicated by a rectangular frame. As shown in FIG. 4B, the region extraction unit 311 may identify the presence region of an iron scrap using the deep learning model that outputs rectangular information in which the presence region of an iron scrap is expressed with a rectangular frame (for example, coordinate data indicating the position of the rectangular frame) and output the presence region of an iron scrap to the incompatible object identifying unit 312. At this time, from the region extraction unit 311 to the incompatible object identifying unit 312, the original image and the rectangular information corresponding to the presence region of an iron scrap may be output as a set or only an image obtained by cutting the presence region of an iron scrap from the original image based on the rectangular information may be output.

In addition, in a case where the uninspected iron scraps 4 are transported with the lift magnet 11, the region extraction unit 311 may change the region size of the presence region of an iron scrap to be output to the incompatible object identifying unit 312 according to the magnetic force intensity of the lift magnet 11. Specifically, the region extraction unit 311 may identify the position of the lift magnet 11 in the image using the deep learning model or the like, which has learned the characteristics of the lift magnet 11 in advance, and then set a rectangular region with a size according to the magnetic force intensity of the lift magnet 11 immediately below the lift magnet 11 as the presence region of an iron scrap. Regarding a change in the magnetic force intensity of the lift magnet 11, the magnetic force intensity can be adjusted by controlling the amount of a current flowing through an electromagnet using an electromagnetic lift magnet including the electromagnet inside. The size of the presence region of an iron scrap may also be changed according to the load of a luggage suspended from the lift magnet 11 (suspended load amount) instead of the magnetic force intensity of the lift magnet 11. In this case, the suspended load amount can be measured using known measuring means (for example, a load cell or the like). Hereinafter, in order to simplify the description, a case where the size of the presence region of an iron scrap is changed according to the magnetic force intensity will be described as an example.

Figure 5:
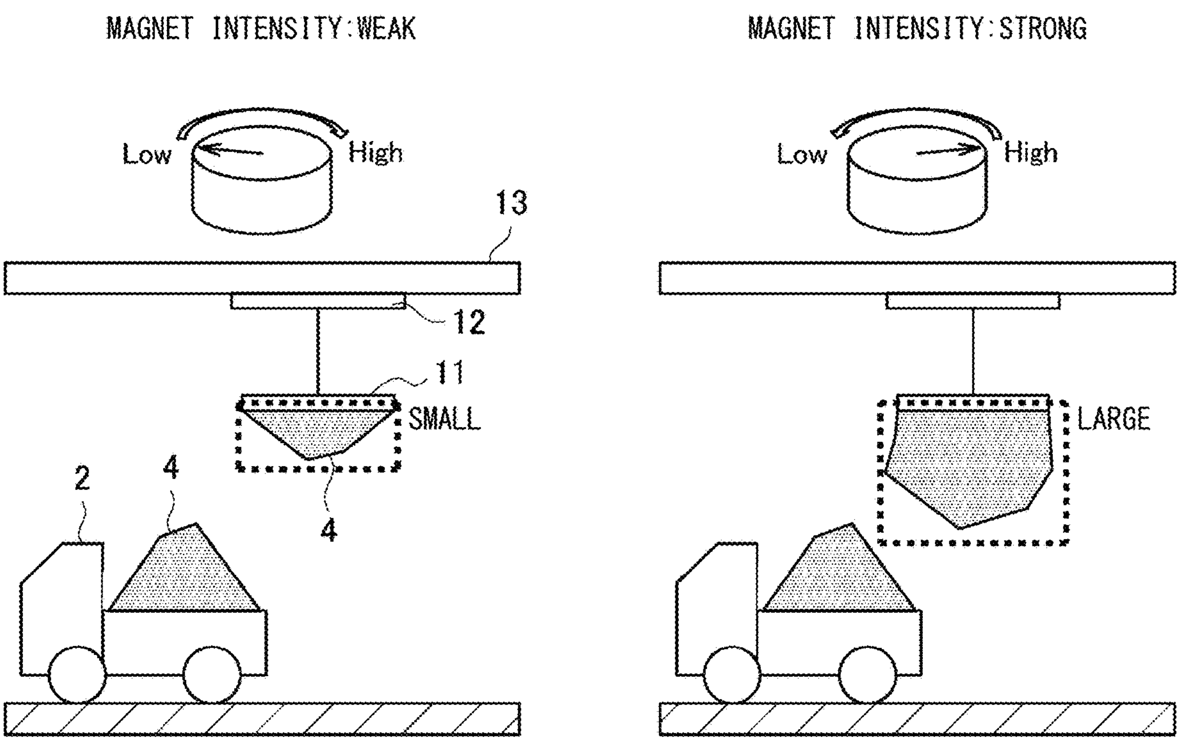
FIG. 5 shows views showing examples in which the size of the presence region of an iron scrap is changed according to the magnetic force intensity of a lift magnet.

FIG. 5 is a view showing an example in which the size of the presence region of an iron scrap is changed according to the magnetic force intensity of the lift magnet 11. As shown in the left picture of FIG. 5, when the magnetic force intensity of the lift magnet 11 is weak, since the amount of the uninspected iron scraps 4 adsorbed to the lift magnet 11 is small, the presence region of an iron scrap is set to be relatively small. On the other hand, as shown in the right picture of FIG. 5, when the magnetic force intensity of the lift magnet 11 is strong, since the amount of the uninspected iron scraps 4 adsorbed to the lift magnet 11 increases, the presence region of an iron scrap is set to be relatively large.

The above-described method for extracting the presence region of an iron scrap can be independently applied to each of the images photographed at a plurality of timings; however, in the method for extracting the presence region of an iron scrap, a plurality of images photographed at different timings can also be used. For example, the region extraction unit 311 may extract the presence region of an iron scrap that is to be output to the incompatible object identifying unit 312 as a moving object presence region by moving body detection. This uses a property of camera images where the inspection operation is captured, that is, while the conveyance tool such as the lift magnet and the iron scraps that are conveyed by the conveyance tool are moving, other objects shown to cameras all stay still, and the conveyance tool and the iron scrap region are extracted by moving body detection. As a method for the moving body detection, it is possible to use a known technique in which a differential image between an image photographed at the present time and an image photographed slightly earlier is obtained and a portion with a large value is extracted. A region thus extracted is output to the incompatible object identifying unit 312. In this extracted region, there is no possibility of incompatible objects being included in the portion of the conveyance tool. Therefore, the presence region of an iron scrap may be output to the incompatible object identifying unit 312 after the portion of the conveyance tool is identified by another image processing (matching with an image pattern of the conveyance tool acquired in advance or the like) and this portion is removed.

A region with a predetermined size at a predetermined position in the image may be set as the presence region of an iron scrap without using the region extraction unit 311 and the technique such as the deep learning model.

In addition, the image acquired with the image acquisition unit 310 may be output to the incompatible object identifying unit 312 as it is without providing the region extraction unit 311.

(Incompatible Object Identifying Unit 312)

Returning to FIG. 3, in an incompatible object identifying step, the incompatible object identifying unit 312 inputs the plurality of images acquired with the image acquisition unit 310 (the images converted into the predetermined size or the images of the regions extracted with the region extraction unit 311) into a deep learning model (a learning model that has been trained by machine learning) to identify the types and positions of the incompatible objects and the probabilities of being an incompatible object. In addition, the position of an incompatible object at the time of detecting the incompatible object is identified, which makes it possible for the operator to immediately visually confirm the place of the incompatible object in the image. This makes it possible for the operator to determine the positions of the incompatible object on the image within a short period of time and makes it possible to further enhance the accuracy of a monitoring method and the monitoring system.

In the present embodiment, the iron scraps while being transported are shown on a display, and the positions, probabilities, and types of incompatible objects with respect to the iron scraps while being transported are further displayed. This makes it possible for the operator to accurately grasp what types of incompatible objects are present at what positions.

The position of the incompatible object may be displayed by, for example, surrounding a region where the incompatible object is present with a frame. In addition, the type of the incompatible object may be displayed by, for example, changing the color, shape or the like of the frame set in advance for each type of incompatible object or displaying the type of the incompatible object with a text. In addition, the probability of the incompatible object may be displayed by, for example, displaying the probability of the incompatible object being present in a region surrounded by the frame with a numerical value on the display. In order to display the iron scraps while being transported on the display, an image of the iron scraps acquired with the capturing device may always be displayed on the display. In the present embodiment, not only the positions and types of the incompatible objects but also the probabilities of the incompatible objects are output in an output step, but only the positions and types of the incompatible objects may be output.

As a method for setting the types of incompatible objects, for example, the types can be set according to the functions of incompatible objects during use, such as a motor and a gas cylinder, but the method is not limited thereto. For example, motors, gas cylinders, and other incompatible objects may be all collectively treated as one type. In this case, there is only one type of incompatible object (for example, one type of "incompatible object"). Compared with finely divided types such as a motor, a gas cylinder, and the like, the amount of information to be obtained becomes small, but it is possible to output information that at least needs to be output, such as the presence of an incompatible object that needs to be removed. In addition, a combination of methods for setting the types of incompatible objects can also be considered. For example, in the output from the deep learning model in the incompatible object identifying unit 312, the types are finely divided into a motor, a gas cylinder, and the like; however, in the output from the output unit 32, all incompatible objects can also be output in one type.

The learning model used here is not particularly limited, machine learning models that output the type and position of an object in an image and the probability of being the object as described in Non-Patent Document 1 and Non-Patent Document 2 may be used, machine learning models in which normal images are trained and deviation from normal is detected as an abnormality as described in Non-Patent Documents 3 to 5 may also be used, and an image processing technique, such as pattern matching in which a person sets in advance and detects the shape pattern of an incompatible object, may also be used. In Non-Patent Documents 1-5, one image is input to the deep learning model each time of determination, but a plurality of images that are continuous in chronological order may be input, and these may be comprehensively determined to output the type and position of an object and the probability of being the object. In the following description, the number of images that are input to the deep learning model will be described as one.

(Determination Unit 313)

The determination unit 313 determines whether or not the probability of being an incompatible object identified with the incompatible object identifying unit 312 exceeds a predetermined threshold value. In addition, when the probability of being an incompatible object exceeds the predetermined threshold value, the determination unit 313 transmits each of the type and position of the incompatible object and the probability of being an incompatible object to the output unit 32.

In addition, the incompatible object detection device 30 may further have a model generation unit 33, a model output unit 34, and a data storage unit 35 as shown in FIG. 3.

(Model Generation Unit 33)

The model generation unit 33 generates one or a plurality of learning models that identify the type and position of an incompatible object and the probability of being an incompatible object from the image of the uninspected iron scraps 4 photographed with the photographing device 20.

The model generation unit 33 generates a model that identifies the type and position of an incompatible object in an image and the probability of being an incompatible object by machine learning using a plurality of data in which images of the uninspected iron scraps 4 in the past photographed with the photographing device 20 and information indicating the type and position of an incompatible object included in the images are associated with each other as training data.

Figure 6:
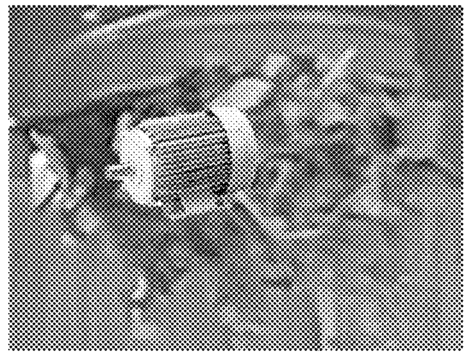
FIG. 6 shows views showing examples of training data that are used to generate a learning model.
Figure 6:
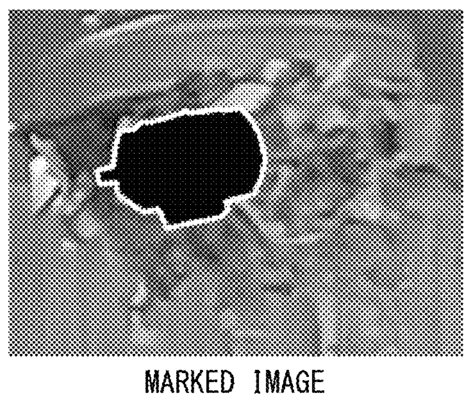
Figure 6:
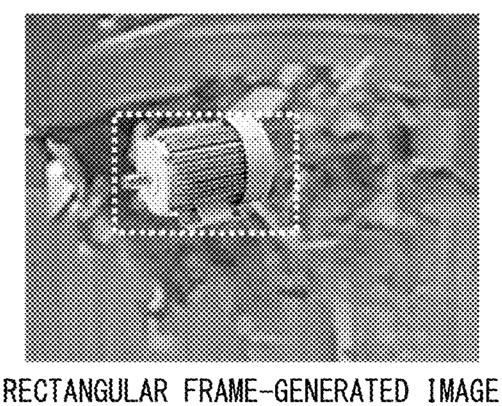

FIG. 6 is a view showing an example of the training data that is used to generate the learning model. In the model generation unit 33, images of the uninspected iron scraps 4 in the past photographed with the photographing device 20 (an original image shown in the upper picture of FIG. 6) and labeled data enabling the specification of right regions where incompatible objects are present in the original images (images shown in the middle view and the lower picture of FIG. 6) are used as a set of training data. For example, an image where a person determines a region where an incompatible object is present in the original image in advance and the entire incompatible object is labeled (marked) as shown in the middle picture of FIG. 6 is used as a set of training data. During training, training is performed by setting an objective function for optimization with respect to the labeled data of the right region designated by the person so that the probability of being an incompatible object becomes the predetermined reference value or more (for example, 100%).

The labeled data used here may be marked image data (the middle picture of FIG. 6) in which the positions of the incompatible object is marked in the original image data (the upper picture of FIG. 6). At this time, as information indicating the type of the marked incompatible object, a brightness value assigned to each incompatible object in advance can be used. For example, in a case where a grayscale image indicated by 0 to 255-level brightness values is used as a marked image, the type of an incompatible object may be made distinguishable with the brightness value of each pixel by marking a motor with a brightness value of 50 and a gas cylinder with a brightness value of 100. It is needless to say that, as information indicating the position of the incompatible object, the coordinates of pixels having a brightness value assigned to the incompatible object may be used.

In addition, the label data may be text data including rectangular information or the like created to surround the periphery of the incompatible object in the image as shown in the lower picture of FIG. 6. For example, in this text data, the coordinate data of the rectangular frame may be used as the position of the incompatible object, and information enabling the identification of the incompatible object in the rectangular frame may be used as the type of the incompatible object.

For the original image data used above, for example, formats of jpg, bmp, png and the like are used, and, for the text data, formats of txt, json, xml and the like are used.

In addition, the model generation unit 33 may execute training with images obtained by photographing normal iron scraps including no incompatible objects as the training data. In this method, as in Non-Patent Document 2 to 4, a machine learning model learns characteristics for expressing the normal iron scraps using a plurality of images of the normal iron scraps including no incompatible objects. When an image including an incompatible object has been input into the trained model generated by training with the normal iron scraps as described above, an abnormal portion and the degree of abnormality are output as an abnormality. In the case of adopting this model, a value based on the degree of abnormality is used as the probability of being an incompatible object that is output to the operator. For example, the value of the degree of abnormality is normalized so as to fall within a range of 0.0 to 1.0, and the degree of abnormality is regarded as the probability of being an incompatible object.

As shown in FIG. 3, the model generation unit 33 acquires training data from the data storage unit 35, which will be described below. The details of a model generation process with the model generation unit 33 will be described below.

(Model Output Unit 34)

The model output unit 34 outputs the learning model generated at the model generation unit 33. For example, the model output unit 34 outputs the learning model generated with the model generation unit 33 to the incompatible object identifying unit 312 so that the learning model can be used when the type and position of an incompatible object and the probability of being an incompatible object are identified in the incompatible object identifying unit 312.

(Data Storage Unit 35)

The data storage unit 35 is a storage device that stores the training data that is used when the model generation unit 33 generates the learning model. The data storage unit 35 may store all images obtained by photographing with the photographing device 20 or may store only images that are scheduled to be used as the training data.

Hitherto, the configuration of the monitoring system 1 according to the present embodiment has been described. The configuration of each device of the monitoring system 1 shown in FIG. 1 and FIG. 3 is an example, one device may have the functions of a plurality of devices, or the monitoring system can also be configured so that a plurality of functions included in one device are performed by different devices.

4. Learning Model Generation Process

Figure 7:
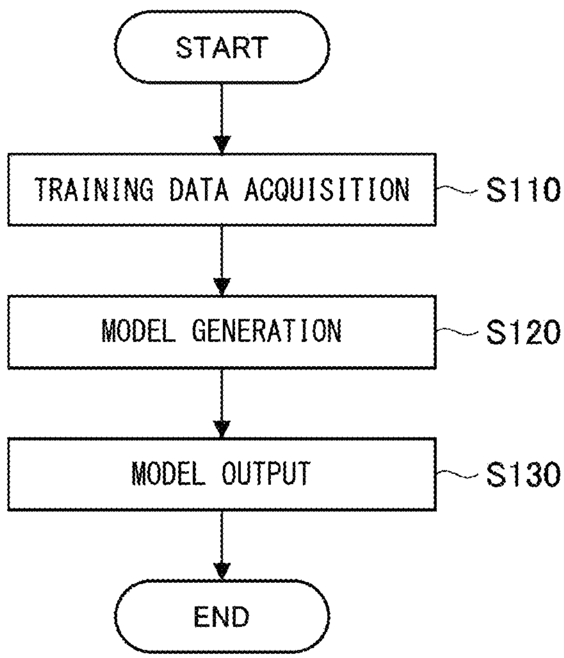
FIG. 7 is a flowchart for describing a learning model generation process according to the present embodiment.

Hereinafter, the operation of the monitoring system 1 according to the present embodiment will be described. First, a learning model generation process that is performed in the monitoring system 1 will be described. FIG. 7 is a flowchart for describing the learning model generation process according to the present embodiment.

The model generation unit 33 starts the learning model generation process based on an instruction from the user in advance before the inspection of iron scraps that are to be reused for the manufacturing of iron or the like is performed using the monitoring system 1. Alternatively, the model generation unit 33 may periodically execute the learning model generation process.

(S110: Training Data Acquisition)

Learning conditions of the learning model of the present embodiment include model conditions, data set conditions, and training setting conditions. The model conditions are conditions relating to the structure of a neural network. The data set conditions include selection conditions of training data to be input to the neural network during training, conditions for a preprocess of the data or an augmentation method of an image, and the like. The training setting conditions include initialization conditions for a parameter of the neural network such as the weight or the bias, condition for an optimization method, conditions for a loss function, and the like. Here, the conditions for a loss function also include conditions for the regularization function.

As shown in FIG. 7, once the learning model generation process is started, first, the model generation unit 33 acquires the training data necessary for the generation of a learning model enabling the detection of incompatible objects included in the iron scraps from the images photographed with the photographing device 20 from the data storage unit 35 (S110). For example, the model generation unit 33 acquires a plurality of data in which the original images of the uninspected iron scraps 4 photographed in the past with the photographing device 20 and information indicating the types and positions of incompatible objects included in the original images are associated with each other as training data.

Here, the information indicating the positions and types of incompatible objects may be the marked image in which the entire incompatible object is labeled (marked) (the middle picture of FIG. 6) or the rectangular frame-generated image in which the rectangular region including the incompatible object is labeled (rectangular frame generation) (the lower picture of FIG. 6). In addition, according to the method described above in the paragraphs with regards to (Model generation unit 33), images of normal uninspected iron scraps 4 including no incompatible objects may also be used as training data. The training data that are acquired in the step S110 are desirably images photographed with the same photographing device 20 as that used to photograph the images used for the detection of incompatible objects with the incompatible object identifying unit 312, but may also be images photographed with a different photographing device 20. In addition, the images that are used as the training data are desirably images obtained by photographing actual incompatible objects contained in the uninspected iron scraps 4, but may be images of incompatible objects that can be acquired from the Internet or the like (a catalog image of a motor or the like).

(S120: Model Generation)

Next, the model generation unit 33 generates a learning model enabling the detection of an incompatible object by machine learning using the training data acquired by the step S110 (S120).

As the learning model that is generated with the model generation unit 33, the following two models are assumed, and any of them may be used. The first is a first learning model that learns the characteristics of an incompatible object in an image using a plurality of data in which an image including the incompatible object (the original image of the upper picture of FIG. 6) and data enabling the specification of a right region where the incompatible object is present in the image (the images of the middle view and the bottom picture of FIG. 6) are associated with each other as training data and calculates the type and position of the incompatible object and the probability of being an incompatible object during detection. The second is a second learning model that learns the characteristics of all normal iron scraps using images of normal uninspected iron scraps 4 including no incompatible objects as training data and calculates an abnormal portion and the degree of abnormality as an abnormality only when an incompatible object is included in the uninspected iron scraps 4 during detection.

First Learning Model

In the case of generating the first learning model, the model generation unit 33 inputs the images including the incompatible objects acquired from the data storage unit 35 (the original image in the upper picture of FIG. 6) into a first learning model and optimizes the learning model so that the positions (regions) of the incompatible objects that are output with the first learning model become close to the right positions where the incompatible objects are present (the position of the incompatible object in the images shown in the middle view and the lower picture of FIG. 6) or the type of the incompatible objects and the probability of being incompatible objects become a predetermined reference value or more (for example, 100%). In the case of using the first learning model of this type for the detection of an incompatible object, the type of the incompatible object, the coordinate data indicating the position (region) of the incompatible object, and the value of a probability indicating the certainty factor are output from the first learning model (for example, Non-Patent Document 1).

Second Learning Model

On the other hand, in the case of generating the second learning model, the model generation unit 33 inputs images of normal uninspected iron scraps 4 including no incompatible objects acquired from the data storage unit 35 into a second learning model and the model learns the characteristics of all normal iron scraps. At this time, the learning model is optimized so that the second learning model to be generated is capable of expressing (outputting) the fact that no incompatible objects are included for the uninspected iron scraps 4. In this case, in the calculation of the position of the incompatible object and the probability of being an incompatible object when an image including an incompatible object is input into the second learning model, a differential image between the image input to the second learning model and an image output from the second learning model or the degree of abnormality is used (for example, Non-Patent Document 3). The second learning model is an example of a model in which a machine learning model learns normal characteristics and an abnormal portion or the degree of abnormality is calculated from an image including the abnormality and is not limited to such an algorithm as in Non-Patent Document 2 (For example, Non-Patent Documents 4 and 5).

When the model generation unit 33 generates a learning model (the first learning model or the second learning model) by machine learning, the learning model is output into the model output unit 34.

(S130: Model Output)

The model output unit 34 outputs the learning model generated in the step S120 to the incompatible object identifying unit 312 (S130).

After that, the model output unit 34 ends the learning model generation process. The incompatible object detection device 30 executes the above-described learning model generation process and is thereby capable of generating a learning model enabling the presence or absence of an incompatible object to be more accurately determined than ever even in a case where the incompatible object is present slightly inside from the surface of the group of iron scraps.

In the above-described embodiment, it has been described that the incompatible object detection device 30 executes the learning model generation process, but the present disclosure is not limited thereto. An independent device apart from the incompatible object detection device 30 may have some or all of the model generation unit 33, the model output unit 34, and the data storage unit 35 and execute the learning model generation process. In this case, the incompatible object detection device 30 may acquire a trained learning model from the separate independent device and execute an incompatible object detection process to be described below.

5. Incompatible Object Detection Process

Figure 8:
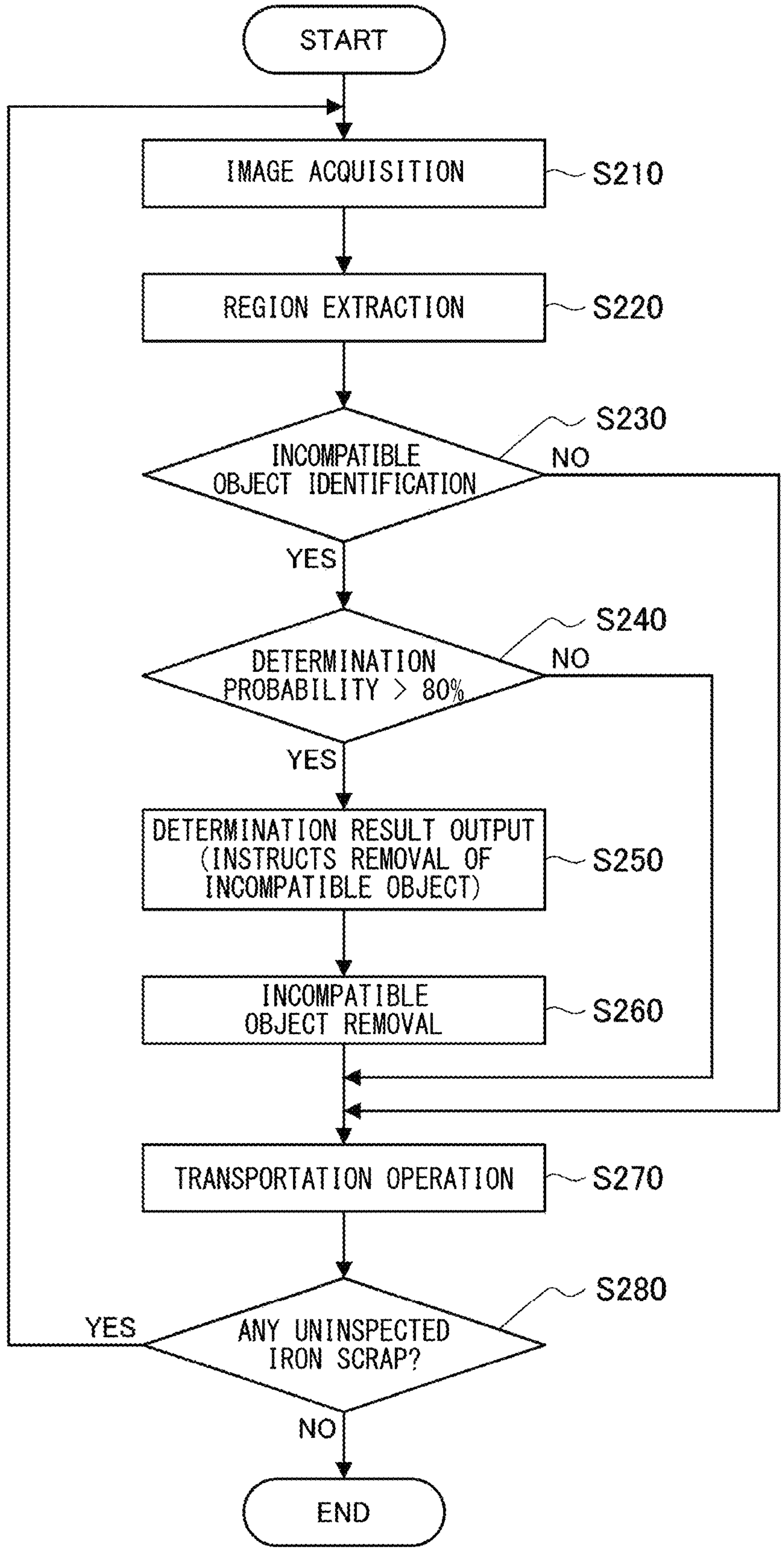
FIG. 8 is a flowchart for describing an incompatible object detection process according to the present embodiment.

Next, an incompatible object detection process that is performed in the monitoring system 1 will be described. FIG. 8 is a flowchart for describing the incompatible object detection process according to the present embodiment.

The detection control unit 31 starts the incompatible object detection process based on an instruction from the user after the truck 2 stops at a predetermined position in the iron scrap yard.

(S210: Image Acquisition)

As shown in FIG. 8, when the incompatible object detection process is started, first, the image acquisition unit 310 controls the photographing device 20 to perform photographing on the uninspected iron scraps 4 a plurality of times at different viewpoints or at different timings and acquire a plurality of images (a video or a plurality of still images) (S210). The photographing of the uninspected iron scraps 4 may be performed on the uninspected iron scraps 4 in a state of being placed on the bed of the truck 2 or on the uninspected iron scraps 4 while being transported with the transportation device 10. The image acquisition unit 310 converts the images acquired from the photographing device 20 into an appropriate predetermined size and sequentially outputs the images to the region extraction unit 311.

(S220: Region Extraction)

Here, the images acquired in the step S210 are image in which the entire inspection operation site including the uninspected iron scraps 4 is in the angle of view, but the region extraction unit 311 extracts a region that possibly includes an incompatible object (the presence region of an iron scrap) from the images acquired in the step S210 as shown in FIG. 4A or FIG. 4B. For example, the region extraction unit 311 identifies the presence region of an iron scrap using the deep learning model or the like, extracts only the identified presence region of an iron scrap, and outputs the extracted region to the incompatible object identifying unit 312. Here, the presence region of an iron scrap may be a region determined for each pixel or a region determined by a simple rectangular frame. The process of the step S220 can be omitted; in that case, the image acquisition unit 310 may directly output the acquired images into the incompatible object identifying unit 312.

(S230: Incompatible Object Identification)

Next, the incompatible object identifying unit 312 inputs the plurality of images output from the region extraction unit 311 into the learning model generated with the model generation unit 33 by the above-described learning model generation process and identifies each of the type and position of the incompatible object and the probability of being an incompatible object (S230). At this time, in a case where it is possible to identify at least one incompatible object from the images (S230: YES), the incompatible object identifying unit 312 outputs the type and position of the incompatible object and the probability of being an incompatible object output from the learning model into the determination unit 313 and makes the process proceed to a step S240. On the other hand, in a case where it is not possible to identify any incompatible object from the images (S230: NO), the incompatible object identifying unit 312 makes the process proceed to a step S270.

(S240: Determination)

When receiving information of the type and position of the incompatible object and the probability of being an incompatible object from the incompatible object identifying unit 312, the determination unit 313 determines whether or not the probability of being an incompatible object exceeds a predetermined threshold value (example: 80%) (S240). At this time, in a case where the probability of being an incompatible object exceeds the predetermined threshold value (S240: YES), the determination unit 313 transmits each of the type and position of the incompatible object and the probability of being an incompatible object to the output unit 32 by an output procedure and makes the process proceed to a step S250. On the other hand, in a case where the probability of being an incompatible object the predetermined threshold value or less (S240: NO), the determination unit 313 makes the process proceed to the step S270.

(S250: Determination Result Output)

When receiving the output result output from the determination unit 313, the output unit 32 outputs the output result to the operator (inspection operator) (S250). As described above, the output unit 32 outputs each of the type and position of the incompatible object and the probability of being an incompatible object when the probability of being an incompatible object exceeds the predetermined threshold value and thus urges the operator to remove the incompatible object only when needed. The indiscriminate and continuous output of the result of the determination unit 313 to the operator without providing the above-described threshold value would degrade the operator's concentration, which is not preferable in terms of safety. In addition, in the step S250, at the time of detecting the incompatible object, the output unit 32 may output the image input to the learning model (the original image shown in the upper picture of FIG. 6) and the labeled image output from the learning model (a format as shown in the marked image shown in the middle picture of FIG. 6 or the rectangular frame-generated image shown in the lower picture of FIG. 6) as well.

In the present embodiment, a case where the output unit 32 outputs each of the type and position of the incompatible object and the probability of being an incompatible object when the probability of being an incompatible object exceeds the predetermined threshold value has been described, but the present disclosure is not limited thereto. When the probability of being an incompatible object exceeds the predetermined threshold value, the output unit 32 may be configured to output each of the type and position of the incompatible object and does not necessarily need to output the probability of being an incompatible object.

(S260: Incompatible Object Removal)

When realizing that there is a concern that the incompatible object may be included in the uninspected iron scraps 4, the operator who has received the output of the output unit 32 performs the removal of the incompatible object included in the uninspected iron scraps 4 (S260). In the removal operation mentioned herein, the group of iron scraps including the incompatible object is once spread on the ground, and the incompatible object is removed using humans, heavy machinery, robots, or the like. After the removal, according to the operator's operation, the end of the removal operation is notified to the detection control unit 31, and the detection control unit 31 makes the process proceed to the step S270.

(S270: Transportation Operation)

When the process proceeds to the step S270, for example, the output unit 32 performs a notification of urging the operator to start, continue, or resume the transportation operation. The transportation control unit 14 controls the lift magnet 11 and the crane 12 based on an instruction from the operation unit 15 and starts, continues, or resumes the transportation of the uninspected iron scraps 4. In a case where it was not possible to identify any incompatible objects (S230: NO) or a case where an incompatible object was identified but the probability of being an incompatible object did not exceed the predetermined threshold value (S240: NO), it is possible to continue the transportation operation without performing any of notification or display to the operator.

(S280: End Determination)

The steps from the S210 to the S270 are repeated until there are no uninspected iron scraps 4 in the bed of the truck 2 (S280: YES).

When there are no uninspected iron scraps 4 in the bed of the truck 2 (S280: NO), the detection control unit 31 ends the incompatible object detection process. The incompatible object detection device 30 is capable of sequentially inspecting iron scraps while being transported using a single or a plurality of cameras and is capable of highly accurately inspecting incompatible objects in iron scraps, the angle or degree of exposure of which changes during transportation, by executing the above-described incompatible object detection process. Therefore, it is possible to more accurately determine the presence or absence of an incompatible object than ever even in a case where the incompatible object is present slightly inside from the surface of the group of iron scraps, and the operator can reliably remove the incompatible object that needs to be removed from the uninspected iron scraps 4 at an appropriate timing.

6. Modification Examples

Hitherto, the preferred embodiment of the present disclosure has been described in detail with reference to the accompanying drawings, but the present disclosure is not limited to such examples. It is evident that a person skilled in the art of the present disclosure is able to conceive a variety of modification examples or correction examples within the scope of the technical concept described in the claims, and it is needless to say that such examples are also understood to be in the technical scope of the present disclosure.

For example, in the above-described embodiment, photographing is performed with the fixed photographing direction and photographing magnification of the photographing device 20, but the present disclosure is not limited to such an example. For example, the photographing device 20 may be configured so as to be capable of tracking and photographing the uninspected iron scraps 4 while being transported by sequentially adjusting the photographing direction (angle) and the photographing magnification (magnification) based on at least any information regarding the position of the uninspected iron scraps 4 while being transported with the transportation device 10 and the operation of the transportation device 10. Particularly, in a case where the photographing magnification is adjusted, since it is possible to increase the proportion of the presence region of the iron scraps in the angle of view, it is possible to limit an image region to be processed when the incompatible object detection device 30 detects an incompatible object and to shorten the process time. In addition, since it is possible to reduce the resolution of an image to be input into the learning model used for the detection of an incompatible object, it is possible to shorten the process time of the entire incompatible object detection device 30.

Figure 9:
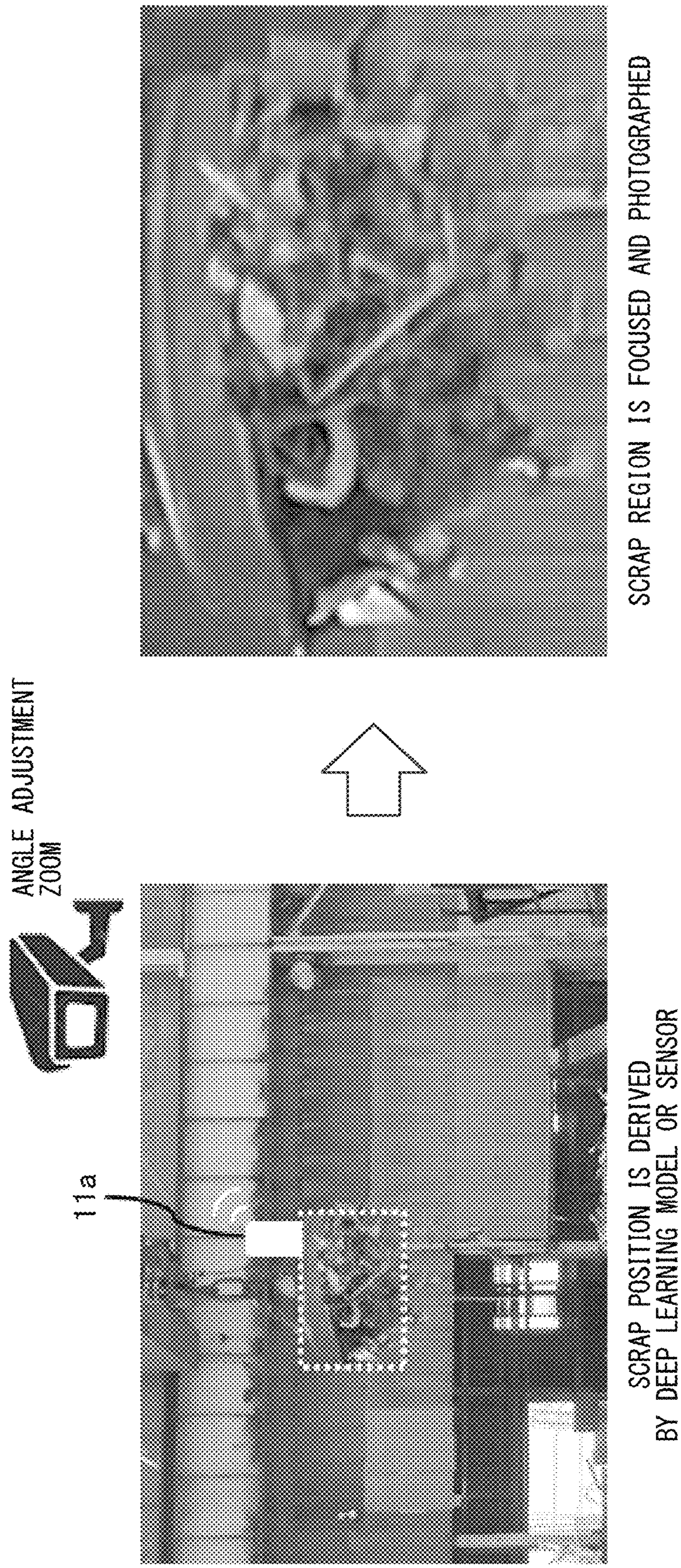
FIG. 9 shows views showing a configuration example of a case where uninspected iron scraps while being transported are tracked and photographed.

FIG. 9 is a view showing a configuration example of a case where the uninspected iron scrap 4 while being transported is tracked and photographed. For example, as shown in FIG. 9, a sensor (GPS or the like) 11*a* capable of identifying the current position is attached to the lift magnet 11. In addition, the detection control unit 31 of the incompatible object detection device 30 identifies the position of the uninspected iron scrap 4 using the latest information (the current position of the lift magnet 11) of the sensor 11*a*. Accordingly, the photographing device 20 may sequentially adjust the photographing direction (angle) and the photographing magnification (zoom magnification). In addition, even in a case where the uninspected iron scraps 4 while being transported are tracked and photographed, the photographing device 20 may sequentially adjust the photographing direction and the photographing magnification according to the magnetic force intensity of the lift magnet 11.

In addition, the detection control unit 31 may be configured to acquire instruction information input into the operation unit 15 for controlling the lift magnet 11 and the crane 12, position information of the lift magnet 11 in an image to be obtained from the deep learning model, which learned the characteristics of the lift magnet 11 and the like and use any or a combination of a plurality of the information.

Figure 10:
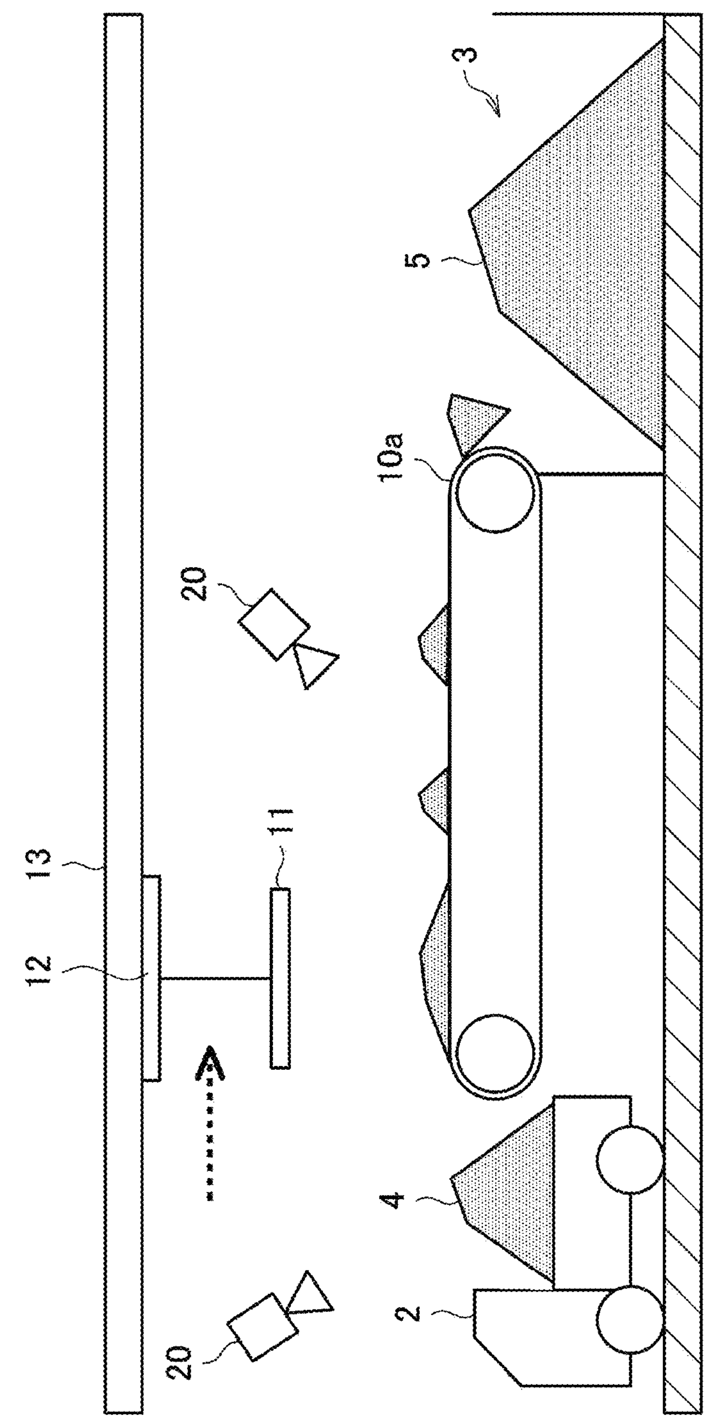
FIG. 10 is a view showing an example of a case where a transportation device is a belt conveyor.

In addition, in the present embodiment, an example in which the transportation device 10 lifts and transports the uninspected iron scraps 4 with the magnetic force of the lift magnet 11 has been described, but the present disclosure is not limited to such an example. For example, the transportation device 10 may be a belt conveyor. FIG. 10 is a view showing an example of a case where the transportation device 10 is a belt conveyor. As shown in FIG. 10, a belt conveyor 10*a* capable of transporting the uninspected iron scraps 4 may be installed between the bed of the truck 2 and the inspected iron scrap piling yard 3, and a step of transporting the uninspected iron scraps 4 up to the inspected iron scrap piling yard 3 with the belt conveyor may be photographed with the photographing device 20 to inspect products. From the uninspected iron scraps 4 while being transported with the belt conveyor 10*a*, there is a higher possibility of an incompatible object being exposed than the uninspected iron scraps 4 on the bed of the truck 2 or in a state of being lifted with the lift magnet 11, and the detection accuracy of the incompatible object can be increased.

7. Hardware Configuration

Figure 11:
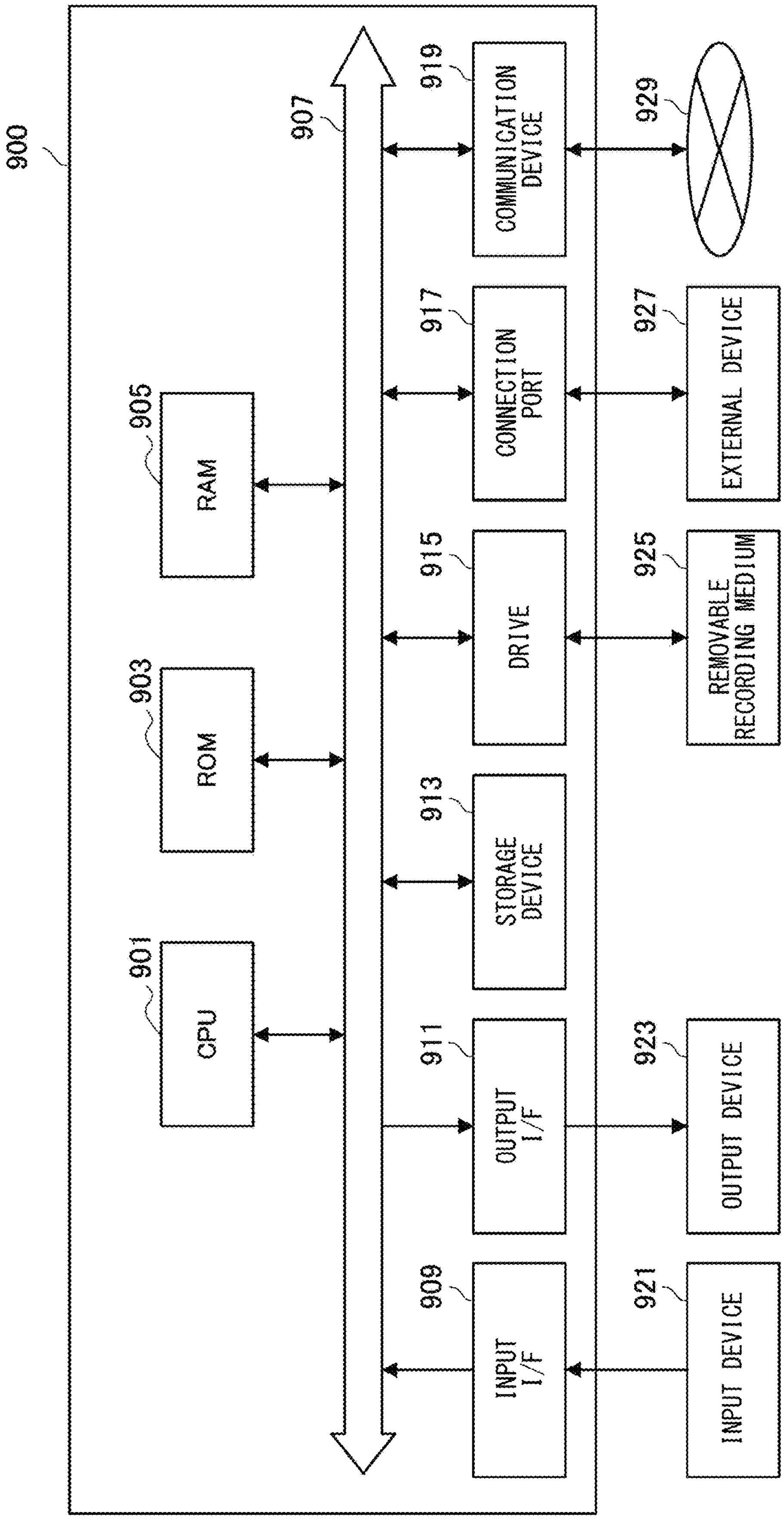
FIG. 11 is a block diagram showing an example of a hardware configuration of an incompatible object detection device in the present embodiment and modification examples.

FIG. 11 is a block diagram showing an example of the hardware configuration of the incompatible object detection device 30 in the present embodiment and modification examples.

The incompatible object detection device 30 includes a processor (CPU 901 in FIG. 11), a ROM 903, and a RAM 905. In addition, the incompatible object detection device 30 includes a bus 907, an input I/F 909, an output I/F 911, a storage device 913, a drive 915, a connection port 917, and a communication device 919.

The CPU 901 functions as an arithmetic processing device and a control device. The CPU 901 controls all or part of the operations in the incompatible object detection device 30 according to a variety of programs recorded in the ROM 903, the RAM 905, the storage device 913, or a removable recording medium 925. The ROM 903 stores programs, calculation parameters, or the like that are used by the CPU 901. The RAM 905 primarily stores programs used by the CPU 901, parameters that are appropriately changed in the execution of the programs or the like. These are connected to one another with the bus 907 composed of an internal bus such as a CPU bus.

The bus 907 is connected to an external bus such as a peripheral component interconnect/interface (PCI) bus via a bridge.

The input I/F 909 is an interface that receives an input from an input device 921, which is operation means operated by a user, for example, a mouse, a keyboard, a touch panel, a button, a switch, a lever, or the like. The input I/F 909 is configured as, for example, an input control circuit or the like that generates an input signal based on information input by the user using the input device 921 and outputs the input signal to the CPU 901. The input device 921 may be, for example, a remote control device for which infrared rays or other radio waves are used or an external device 927 such as a PDA that corresponds to the operation of the incompatible object detection device 30. The user of the incompatible object detection device 30 can operate the input device 921 and input a variety of data to the incompatible object detection device 30 or instruct a process operation.

The output I/F 911 is an interface that outputs the input information to an output device 923 capable of visually or aurally notifying the input information to the user. The output device 923 may be, for example, a display device such as a CRT display device, a liquid crystal display device, a plasma display device, an EL display device, or a lamp. Alternatively, the output device 923 may be a sound output device such as a speaker or a headphone, a printer, a mobile communication terminal, a facsimile, or the like. The output I/F 911 instructs the output device 923 to output process results obtained by a variety of processes executed with, for example, the incompatible object detection device 30. Specifically, the output I/F 911 instructs the display device to display the process result with the incompatible object detection device 30 as a text or an image. In addition, the output I/F 911 instructs the sound output device to convert an audio signal, such as audio data reproduction of which is instructed, into an analog signal and output the analog signal.

The storage device 913 is one of storage units of the incompatible object detection device 30 and is a device for data storage. The storage device 913 is composed of, for example, a magnetic storage device such as a hard disk drive (HDD), a semiconductor storage device, an optical storage device, an optical magnetic storage device, or the like. The storage device 913 stores programs that are executed with the CPU 901, a variety of data generated by the execution of the programs, a variety of data acquired from the outside, and the like.

The drive 915 is a recording medium reader/writer and is built in or externally attached to the incompatible object detection device 30. The drive 915 reads information recorded in the mounted removable recording medium 925 and outputs the information to the RAM 905. In addition, the drive 915 is also capable of writing information in the mounted removable recording medium 925. The removable recording medium 925 is, for example, a magnetic disk, an optical disk, a photomagnetic disk, a semiconductor memory, or the like. Specifically, the removable recording medium 925 may be a CD medium, a DVD medium, a Blu-ray (registered trademark) medium, a CompactFlash (registered trademark) (CF), a flash memory, a secure digital memory card (SD memory card), or the like. In addition, the removable recording medium 925 may be, for example, an integrated circuit card (IC card) on which a non-contact type IC chip is mounted, an electronic device, or the like.

The connection port 917 is a port for directly connecting devices to the incompatible object detection device 30. The connection port 917 is, for example, a universal serial bus (USB) port, an IEEE1394 port, a small computer system interface (SCSI) port, an RS-232C port, or the like. The information processing device 900 is capable of directly acquiring a variety of data from the external device 927 connected to the connection port 917 or providing a variety of data to the external device 927.

The communication device 919 is a communication interface composed of, for example, a communication device or the like for connecting to a communication network 929. The communication device 919 is, for example, a communication card or the like for a wired or wireless local area network (LAN), Bluetooth (registered trademark), or wireless USB (WUSB). In addition, the communication device 919 may be a router for optical communication, a router for an asymmetric digital subscriber line (ADSL), a modem for a variety of communications, or the like. The communication device 919 is capable of transmitting and receiving signals or the like to and from, for example, the Internet or other communication devices according to a predetermined protocol, for example, TCP/IP or the like. In addition, the communication network 929 connected to the communication device 919 is composed of a network or the like connected via a wire or wirelessly. For example, the communication network 929 is the Internet, a home LAN, infrared communication, radio wave communication, satellite communication, or the like.

Hitherto, an example of the hardware configuration of the incompatible object detection device 30 has been described. Each of the above-described configuration elements may be configured using a general-purpose member or may be composed of hardware specialized in the function of each configuration element. The hardware configuration of the incompatible object detection device 30 can be changed as appropriate according to the technical level when the present embodiment is implemented. In addition, the present embodiment may include a computer-readable recording medium in which the above-described computer program is stored.

8. Examples

In order to verify the effect of the method according to the embodiment, a learning model for detecting an incompatible object was generated using the monitoring system 1 shown in FIG. 1, an incompatible object in iron scraps was detected and removed, and the detection rate was calculated. In the present example, the incompatible object was limited to a motor which is an incompatible object that is most often incorporated. 589 motors were prepared, 489 motors were assigned for model training, and 100 motors were assigned for the verification of inspection performance in scrap yards.

First, each of the 489 motors for training were photographed twice with a different angle, background, or the like, thereby acquiring a total of 978 images for training. As the photographing environments at this time, the motor was placed on the ground and photographed or intentionally mixed with the uninspected iron scrap 4, thereby acquiring images showing almost actual inspection scenes. As photographing equipment, the same photographing equipment as the photographing device 20 of the monitoring system 1 used at the time of inspection was used for photographing. For these 978 images in total, text data (labeled data) including information indicating the position and type of an incompatible object in the image and the probability thereof as shown in the lower picture of FIG. 6 were created, and an original image and the labeled data were used as a data set for training.

As a learning model, YOLOv3 (Non-Patent Document 1), which is well known as a deep learning model, was used. This model is a model that learns images and information of rectangular frames created so as to surround the periphery of incompatible objects in the images as shown in the lower picture of FIG. 6, thereby outputting information of a rectangular frame indicating the position of an incompatible object included in an unknown image when the image is input. That is, in the present example, an image including the motor was input into a model that had already learned the motor, whereby the type of an incompatible object (motor) in the image, information of a rectangular frame indicating the position thereof, and the probability of being a motor were output.

Table 1 is a table in which a comparative example, Examples 1 and 2 are compared with one another regarding experimental methods for verifying the effect of the method according to the embodiment. In the comparative example and Examples 1 and 2, a common deep learning model (YOLOv3) was used. In addition, as shown in Table 1, in the comparative example and Examples 1 and 2, the camera arrangement and the photographing method (still image, video) were set under different conditions, and experiments were performed separately.

In the comparative example, as disclosed in Patent Document 2, the detection target of an incompatible object was iron scraps on the bed of a truck. In addition, photographing and detection were performed only once after it was confirmed that a lift magnet carried the iron scraps out of the bed of the truck and the lift magnet was not in the camera angle of view. When an incompatible object was detected in the photographed image by this one round of detection, the presence or absence of the incompatible object was output to an operator, and the operator removed the incompatible object.

In contrast, in Example 1, a photographing target was iron scraps while being transported with a lift magnet, photographing and detection were sequentially performed during an inspection operation as shown in FIG. 1 and FIG. 8, and, only when the probability of being an incompatible object exceeds 50% for a detected candidate of an incompatible object, the result was output to the operator, and the operator removed this incompatible object. In addition, in Example 2, a photographing target was photographed using one camera on a truck bed and two cameras, which photographed a lift magnet, as shown in FIG. 2, and the same experiment as in Example 1 was performed.

TABLE 1

| | Comparative Example (Patent Document 2) | Example 1 | Example 2 |
|---|---|---|---|
| Target | Only truck bed | Only lift magnet | Truck bed and lift magnet |
| Photographing timing | Once | Continuous | Continuous |
| Number of cameras | One | One | Three |
| Process flow | Confirm that the lift magnet is not in the camera angle of view<br>↓<br>Photographing<br>↓<br>Deep learning model<br>↓<br>The presence or absence of an incompatible object is output to an operator | Photographing<br>↓<br>Deep learning model<br>↓<br>Whether or not the incompatible object probability exceeds a threshold value is determined<br>↓ (YES)<br>The incompatible object is output to an operator | Photographing<br>↓<br>Deep learning model<br>↓<br>Whether or not the incompatible object probability exceeds a threshold value is determined<br>↓ (YES)<br>The incompatible object is output to an operator |

Table 2 shows the results of the comparative example and the results of the inspection operations performed according to Examples 1 and 2. In the present experiments, 100 motors for test, which were not used in the training of the model, were intentionally mixed into a total of 1000 tons of normal iron scraps, an inspection experiment was performed by each method, and the final detection counts were compared.

TABLE 2

| | | Comparative Example | Example 1 | Example 2 |
|---|---|---|---|---|
| Detection count | Bed | 71 motors | 0 motors | 72 motors |
| | Lift magnet | 0 motors | 82 motors | 17 motors |
| | | 71 motors/ 100 motors | 82 motors/ 100 motors | 89 motors/ 100 motors |

As shown in Table 2, in Example 1 in which the lift magnet was continuously photographed using one camera, it was possible to detect 11 more motors as the incompatible objects compared with the comparative example in which detection was performed only once on the bed of the truck. This is an effect of an increase in chances of photographing the incompatible objects since the angles or exposure status of the incompatible objects in the iron scraps changed while the iron scarps were transported in Example 1 in contrast to the comparative Example in which the detection of the incompatible object was performed only once.

Figure 12:
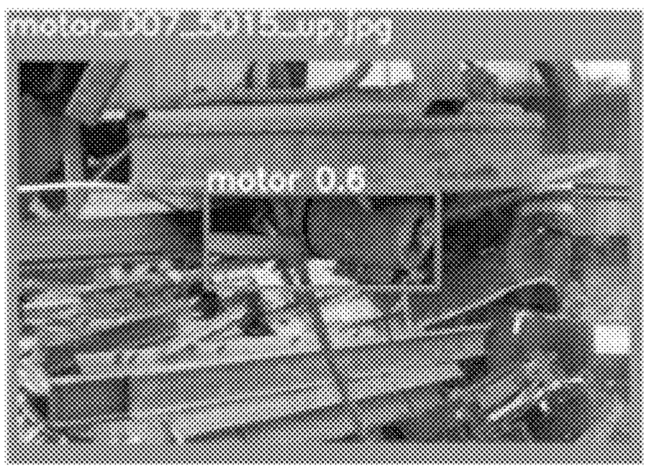
FIG. 12 is a view showing an example in which an incompatible object is exposed through the transportation of the lift magnet and successfully detected in Example 1.

FIG. 12 is a view showing an example in which the incompatible object was exposed through the operation of the lift magnet and successfully detected in Example 1. As shown in FIG. 12, it is found that a rectangular frame has been generated at the position of the incompatible object. In Example 2 in which a plurality of cameras were used, since it was also possible to detect the incompatible object that was in a blind spot in Example 1, it was possible to detect 12 more motors than in Example 1. In the present experiments, the inspection accuracy was higher in both Examples 1 and 2 than in the comparative example.

BRIEF DESCRIPTION OF THE REFERENCE SYMBOLS

1 Monitoring system
2 Truck
3 Inspected iron scrap piling yard
4 Uninspected iron scrap
5 Inspected iron scrap
10 Transportation device
10*a* Belt conveyor
11 Lift magnet
11*a* Sensor
12 Crane
13 Crane rail
14 Transportation control unit
15 Operation unit
20 Photographing device
20*a* First camera
20*b* Second camera
20*c* Third camera
30 Incompatible object detection device
31 Detection control unit
32 Output unit
33 Model generation unit
34 Model output unit
35 Data storage unit
310 Image acquisition unit
311 Region extraction unit
312 Incompatible object identifying unit
313 Determination unit
901 CPU
903 ROM
905 RAM
907 Bus
909 Input I/F
911 Output I/F
913 Storage device
915 Drive
917 Connection port
919 Communication device
921 Input device
923 Output device
925 Removable recording medium
927 External device
929 Communication network

What is claimed is:

1. A monitoring system that is a system for monitoring an iron scrap, comprising:

a photographing unit that photographs the iron scrap a plurality of times at different timings including current time;

an incompatible object identifying unit that inputs a plurality of images obtained by photographing with the photographing unit into a learning model to identify each of a type and a position of an incompatible object that is a target to be removed from the iron scrap and a probability of being an incompatible object, and inputs a probability of being an incompatible object at the current time identified by the learning model and a probability of being an incompatible object identified by the learning model at timings earlier than the current time into a predetermined function to recalculate a probability of being an incompatible object at the current time; and an output unit that outputs each of the type and position of the incompatible object when the probability calculated with the incompatible object identifying unit has exceeded a predetermined threshold value.

2. The monitoring system according to claim 1, further comprising:

a transportation unit that transports the iron scrap, wherein the photographing unit performs photographing the iron scrap with the iron scrap tracked while being transported, by sequentially adjusting a photographing direction and a photographing magnification based on at least any information regarding a position of the iron scrap while being transported with the transportation unit and an operation of the transportation unit, and the incompatible object identifying unit inputs a plurality of images obtained by photographing with the iron scrap tracked into the learning model and identifies the type and position of the incompatible object and the probability of being an incompatible object.

3. The monitoring system according to claim 1, further comprising:

a region extraction unit that extracts each of a region that possibly includes the incompatible object from each of the plurality of images obtained by photographing with the photographing unit using a first deep learning model, wherein the incompatible object identifying unit inputs an image of each region extracted with the region extraction unit into a second learning model and identifies the type and position of the incompatible object that is a target to be removed from the iron scrap and the probability of being an incompatible object.

4. The monitoring system according to claim 2, wherein the transportation unit is a lift magnet, and the photographing unit sequentially adjusts the photographing direction and the photographing magnification depending on a magnetic force intensity or a suspended load amount of the lift magnet.

5. The monitoring system according to claim 3, further comprising:

a transportation unit that transports the iron scrap, wherein the transportation unit is a lift magnet, and the region extraction unit changes a region size to be extracted depending on a magnetic force intensity or a suspended load amount of the lift magnet.

6. A monitoring method for monitoring an iron scrap, comprising:

photographing the iron scrap a plurality of times at different timings including current time;

inputting a plurality of images obtained by photographing in the photographing into a predetermined learning model to sequentially identify a type and a position of an incompatible object that is a target to be removed from the iron scrap and a probability of being an incompatible object, and inputting a probability of being an incompatible object at the current time identified by the learning model and a probability of being an incompatible object identified by the learning model at timings earlier than the current time into a predetermined function to recalculate a probability of being an incompatible object at the current time; and outputting each of the type and position of the incompatible object when the probability calculated by the inputting has exceeded a predetermined threshold value.

7. A monitoring system that is a system for monitoring an iron scrap, comprising:

a photographing unit that photographs the iron scrap a plurality of times at different viewpoints and at different timings including a certain time;

an incompatible object identifying unit that inputs a plurality of images obtained by photographing with the photographing unit into a learning model to identify each of a type and a position of an incompatible object that is a target to be removed from the iron scrap and a probability of being an incompatible object, and inputs a probability of a plurality of being incompatible objects obtained by inputting a plurality of images photographed at a plurality of viewpoints and at a plurality of timings including the certain time into the learning model to recalculate a probability of being an incompatible object at the certain time; and an output unit that outputs each of the type and position of the incompatible object when the probability calculated with the incompatible object identifying unit has exceeded a predetermined threshold value.

8. A non-transitory computer-readable recording medium having one or more executable instructions stored thereon causing a computer to function as a monitoring system which, when executed by processor circuitry, cause the processor circuitry to perform a monitoring method for monitoring an iron scrap, the method comprising:

photographing an iron scrap that is monitored a plurality of times at different timings including current time;

inputting a plurality of images obtained by photographing in the photographing into a predetermined learning model to sequentially identify a type and a position of an incompatible object that is a target to be removed from the iron scrap and a probability of being an incompatible object, and inputting a probability of being an incompatible object at the current time identified by the learning model and a probability of being an incompatible object identified by the learning model at timings earlier than the current time into a predetermined function to recalculate a probability of being an incompatible object at the current time; and outputting each of the type and position of the incompatible object when the probability calculated by the inputting has exceeded a predetermined threshold value.

9. The monitoring system according to claim 3, wherein the image that is input to the first deep learning model in the region extraction unit is a lower resolution than an image that is input to the second deep learning model in the incompatible object identifying unit.

10. The monitoring system according to claim 3, wherein the incompatible object identifying unit inputs an image, which the transportation unit is removed from a region that is extracted with the region extraction unit and includes the incompatible object, into the learning model.

11. The monitoring method according to claim 6, wherein the inputting the probability of being the incompatible object is obtained by inputting a plurality of images photographed at a plurality of viewpoints and at a plurality of timings including the certain time into the learning model.

12. The monitoring method according to claim 6, further comprising:

transporting the iron scrap, and wherein photographing the iron scrap is performed with the iron scrap tracked while being transported, by sequentially adjusting a photographing direction and a photographing magnification based on at least any information regarding a position of the iron scrap while transporting the iron scrap, and a plurality of images is input obtained by photographing with the iron scrap tracked into the learning model and identifies the type and position of the incompatible object and the probability of being an incompatible object.

13. The monitoring method according to claim 6, further comprising:

extracting each of a region that possibly includes the incompatible object from each of the plurality of images obtained by photographing using a first deep learning model, wherein an image of each region extracted is input into a second deep learning model and the type and position of the incompatible object that is a target to be removed from the iron scrap and the probability of being an incompatible object are identified.

14. The monitoring method according to claim 12, wherein the iron scrap is transported by using a lift magnet, and the photographing direction and the photographing magnification are sequentially adjusted depending on a magnetic force intensity or a suspended load amount of the lift magnet.

15. The monitoring method according to claim 13, wherein the image that is input to the first learning model in the region extraction unit is a lower resolution than an image that is input to the second deep learning model in the inputting.

16. The monitoring method according to claim 6, wherein the inputting the image, which a transportation unit is removed from a region that is extracted with the extracting and includes the incompatible object, into the learning model.

17. The non-transitory computer-readable recording medium according to claim 8, wherein the inputting the probability of being the incompatible object is obtained by inputting a plurality of images photographed at a plurality of viewpoints and at a plurality of timings including the certain time into the learning model.

18. The non-transitory computer-readable recording medium according to claim 8, further comprising:

transporting the iron scrap, and wherein photographing the iron scrap is performed with the iron scrap tracked while being transported, by sequentially adjusting a photographing direction and a photographing magnification based on at least any information regarding a position of the iron scrap while transporting the iron scrap, and a plurality of images is input obtained by photographing with the iron scrap tracked into the learning model and identifies the type and position of the incompatible object and the probability of being an incompatible object.

19. The non-transitory computer-readable recording medium according to claim 8, further comprising:

extracting each of a region that possibly includes the incompatible object from each of the plurality of images obtained by photographing using a first deep learning model, wherein an image of each region extracted is input into a second deep learning model and the type and position of the incompatible object that is a target to be removed from the iron scrap and the probability of being an incompatible object are identified.

20. The non-transitory computer-readable recording medium according to claim 18, wherein the iron scrap is transported by using a lift magnet, and the photographing direction and the photographing magnification are sequentially adjusted depending on a magnetic force intensity or a suspended load amount of the lift magnet.

* * * * *